US009742815B2

(12) United States Patent
Kato

(10) Patent No.: US 9,742,815 B2
(45) Date of Patent: Aug. 22, 2017

(54) INFORMATION PROCESSING APPARATUS AND DETERMINATION RESULT PROVIDING METHOD

(71) Applicant: Yoshinaga Kato, Kanagawa (JP)

(72) Inventor: Yoshinaga Kato, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/014,542

(22) Filed: Feb. 3, 2016

(65) Prior Publication Data
US 2016/0149960 A1   May 26, 2016

Related U.S. Application Data

(63) Continuation of application No. PCT/JP2014/070602, filed on Aug. 5, 2014.

(30) Foreign Application Priority Data

Aug. 6, 2013  (JP) .................................. 2013-163166

(51) Int. Cl.
*H04N 7/14*   (2006.01)
*H04L 29/06*   (2006.01)
(Continued)

(52) U.S. Cl.
CPC ...... *H04L 65/1059* (2013.01); *H04L 65/4015* (2013.01); *H04L 65/80* (2013.01);
(Continued)

(58) Field of Classification Search
USPC .............. 348/14.12, 92, 295, 518, 669, 177, 348/333.02, 51, 52, 739, E7.082
See application file for complete search history.

(56) References Cited

U.S. PATENT DOCUMENTS 7,185,098 B2    2/2007  Wang et al.
7,310,774 B1*  12/2007  Arquie .................... H04L 41/12
                                                                 715/734
(Continued)

FOREIGN PATENT DOCUMENTS

JP   2004-023491   1/2004
JP   2004-166249   6/2004
(Continued)

OTHER PUBLICATIONS

International Search Report Issued on Nov. 11, 2014 in PCT/JP2014/070602 filed on Aug. 5, 2014 (with English translation).
(Continued)

*Primary Examiner* — Yosef K Laekemariam
(74) *Attorney, Agent, or Firm* — Oblon, McClelland, Maier & Neustadt, L.L.P.

(57) ABSTRACT

An information processing apparatus includes a determination unit configured to determine whether a first communication port used by a first communication protocol is available and whether a second communication port used by a second communication protocol is available; and a determination result display unit configured to display a determination result for the first communication port and a determination result for the second communication port individually on a display unit.

19 Claims, 20 Drawing Sheets

(51) Int. Cl.
*H04N 7/15* (2006.01)
*H04M 3/56* (2006.01)

(52) U.S. Cl.
CPC ............ *H04M 3/567* (2013.01); *H04N 7/148* (2013.01); *H04N 7/15* (2013.01)

(56) References Cited

U.S. PATENT DOCUMENTS

| | | | |
|---|---|---|---|
| 7,720,983 B2 | 5/2010 | Klemets et al. | |
| 8,681,197 B2 | 3/2014 | Sunahara | |
| 2010/0241754 A1 | 9/2010 | Niiya | |
| 2010/0284404 A1* | 11/2010 | Gopinath | G06F 9/5005 370/392 |
| 2011/0087795 A1 | 4/2011 | Puri et al. | |
| 2012/0150982 A1 | 6/2012 | Xu et al. | |
| 2013/0060926 A1 | 3/2013 | Kato et al. | |
| 2014/0362718 A1 | 12/2014 | Nagamine et al. | |

FOREIGN PATENT DOCUMENTS

| | | |
|---|---|---|
| JP | 2005-348262 A | 12/2005 |
| JP | 2007-150916 | 6/2007 |
| JP | 2007-536796 | 12/2007 |
| JP | 2013-055403 | 3/2013 |
| JP | 2013-153414 | 8/2013 |
| JP | 2014-217013 | 11/2014 |
| WO | WO 2004/040874 A1 | 5/2004 |
| WO | WO 2014/178443 A1 | 11/2014 |

OTHER PUBLICATIONS

Hideaki Nagaoka, Linux Gyakubiki Taizen 600 no Gokui Network Server Kochiku-hen 1st edition, Shuwa System Co., Ltd., Kazukuni Saito, Nov. 5, 2010 (Nov. 5, 2010), pp. 123, 124 (with English translation).

Office Action issued on Aug. 22, 2016 in the corresponding Singapore Patent Application No. 11201600750V (reference previously filed, submitting additional pp. 1 and 2).

Office Action issued on Aug. 22, 2016 in the corresponding Singapore Patent Application No. 11201600750V.

Extended European Search Report issued Jul. 28, 2016 in Patent Application No. 14833711.6.

* cited by examiner

LOW RESOLUTION

MEDIUM RESOLUTION

HIGH RESOLUTION

FIG.8

| RELAY TERMINAL ID | OPERATION STATE | DATE AND TIME RECEIVED | RELAY TERMINAL IP ADDRESS | MAXIMUM DATA TRANSMISSION SPEED (Mbps) |
|---|---|---|---|---|
| 111a | ONLINE | 2013.02.10.13:42 | 1.2.1.2 | 100 |
| 111b | ONLINE | 2013.02.11.12:05 | 1.2.2.2 | 1000 |
| 111c | ONLINE | 2013.02.10.17:33 | 1.3.1.2 | 100 |
| 111d | ONLINE | 2013.02.10.09:02 | 1.3.2.2 | 10 |

FIG.9

| TERMINAL ID | PASSWORD |
|---|---|
| 01aa | aaaa |
| 01ab | abab |
| 01ba | acac |
| ... | ... |

FIG.10

| TERMINAL ID | TYPE | TERMINAL NAME | OPERATION STATE | DATE AND TIME RECEIVED | IP ADDRESS |
|---|---|---|---|---|---|
| 01aa | CALL TERMINAL | JAPAN TOKYO OFFICE AA TERMINAL | ONLINE (CALL POSSIBLE) | 2013.02.10.13:40 | 1.2.1.3 |
| 01ab | CALL TERMINAL | JAPAN TOKYO OFFICE AB TERMINAL | ONLINE (SUSPENDED) | 2013.02.11.12:00 | 1.2.1.4 |
| 02aa | PRINT TERMINAL | JAPAN TOKYO OFFICE AC TERMINAL | OFFLINE | 2013.02.09.17:30 | 1.2.1.5 |
| ... | ... | ... | ... | ... | ... |
| 01da | CALL TERMINAL | U.S. WASHINGTON D.C. OFFICE DA TERMINAL | ONLINE (CALL POSSIBLE) | 2013.12.10.12:41 | 1.3.2.3 |
| 01db | CALL TERMINAL | U.S. WASHINGTON D.C. OFFICE DB TERMINAL | ONLINE (CALLING) | 2013.02.10.13:30 | 1.3.2.4 |
| 02da | PRINT TERMINAL | U.S. WASHINGTON D.C. OFFICE DC TERMINAL | OFFLINE | 2013.02.10.09:00 | 1.3.2.5 |
| ... | ... | ... | ... | ... | ... |

FIG.11

| REQUESTING TERMINAL ID | DESTINATION TERMINAL ID |
|---|---|
| 01aa | 01ab,···,01ba,01bb,···,01ca,01cb,01da,02aa,02da |
| ... | ... |
| 01ba | 01aa,01ab,01ca,01cb,01da,01db |
| ... | ... |
| 01ca | 01aa,01ab,01ba,···,01da,01ca,···,01da |
| ... | ... |

FIG.12

| RELAY TERMINAL ID | REQUESTING TERMINAL ID | DESTINATION TERMINAL ID | DELAY TIME (ms) | DELAY INFORMATION DATE AND TIME RECEIVED |
|---|---|---|---|---|
| 111a | 01aa | 01da | 200 | 2013.02.10.13:50 |
| 111b | 01ba | 01cb | 50 | 2013.02.11.12:05 |
| 111c | 01bb | 01cc | 400 | 2013.02.10.17:35 |
| ... | ... | ... | ... | ... |

FIG.13

| APPLICATION ID / TERMINAL ID | a001 | a002 | a003 | a004 | a005 |
|---|---|---|---|---|---|
| 01aa | On | On | On | On | On |
| 01ab | On | On | On | Off | On |
| 01ac | On | On | Off | On | On |
| ... | ... | ... | ... | ... | ... |

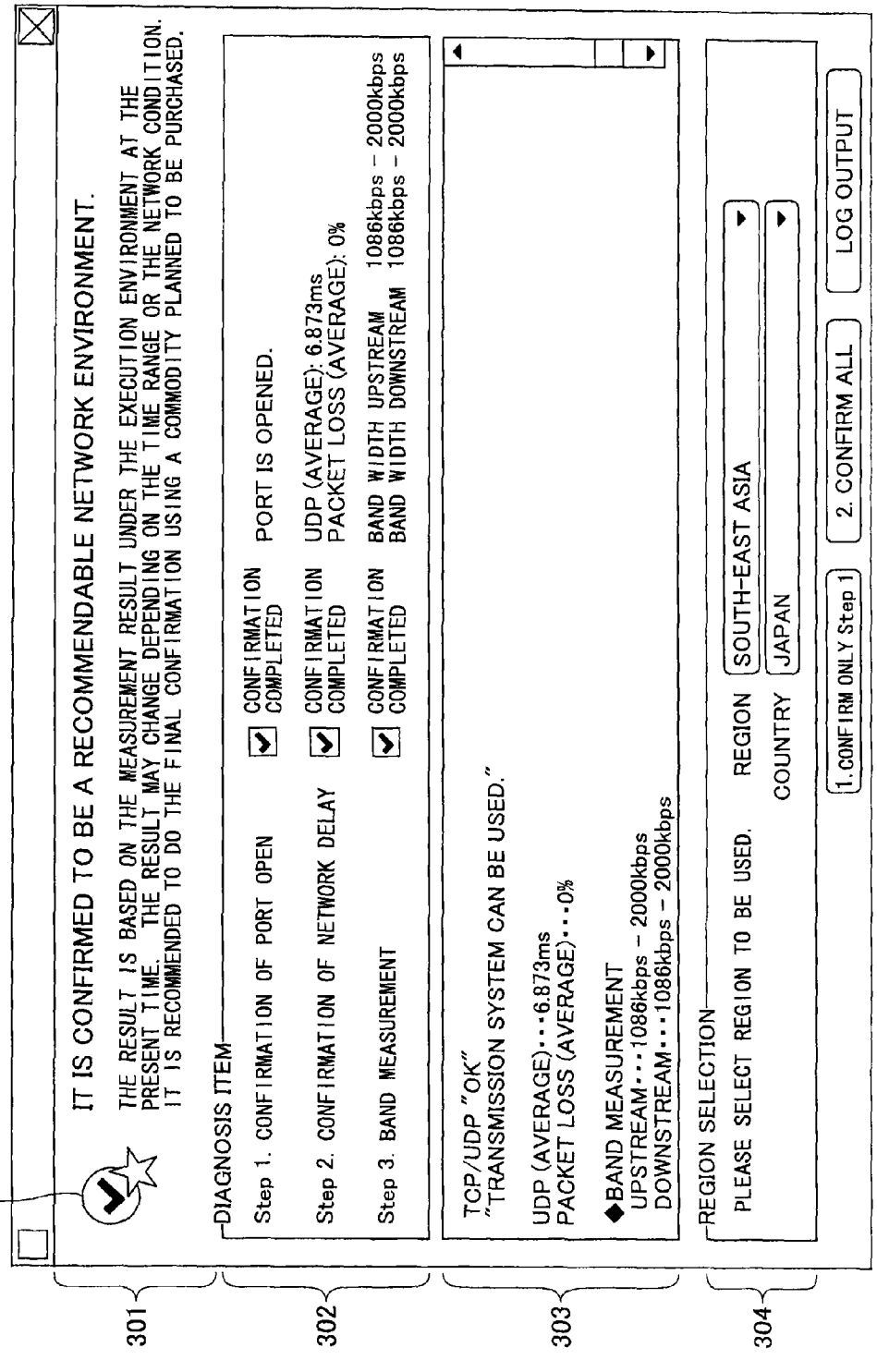

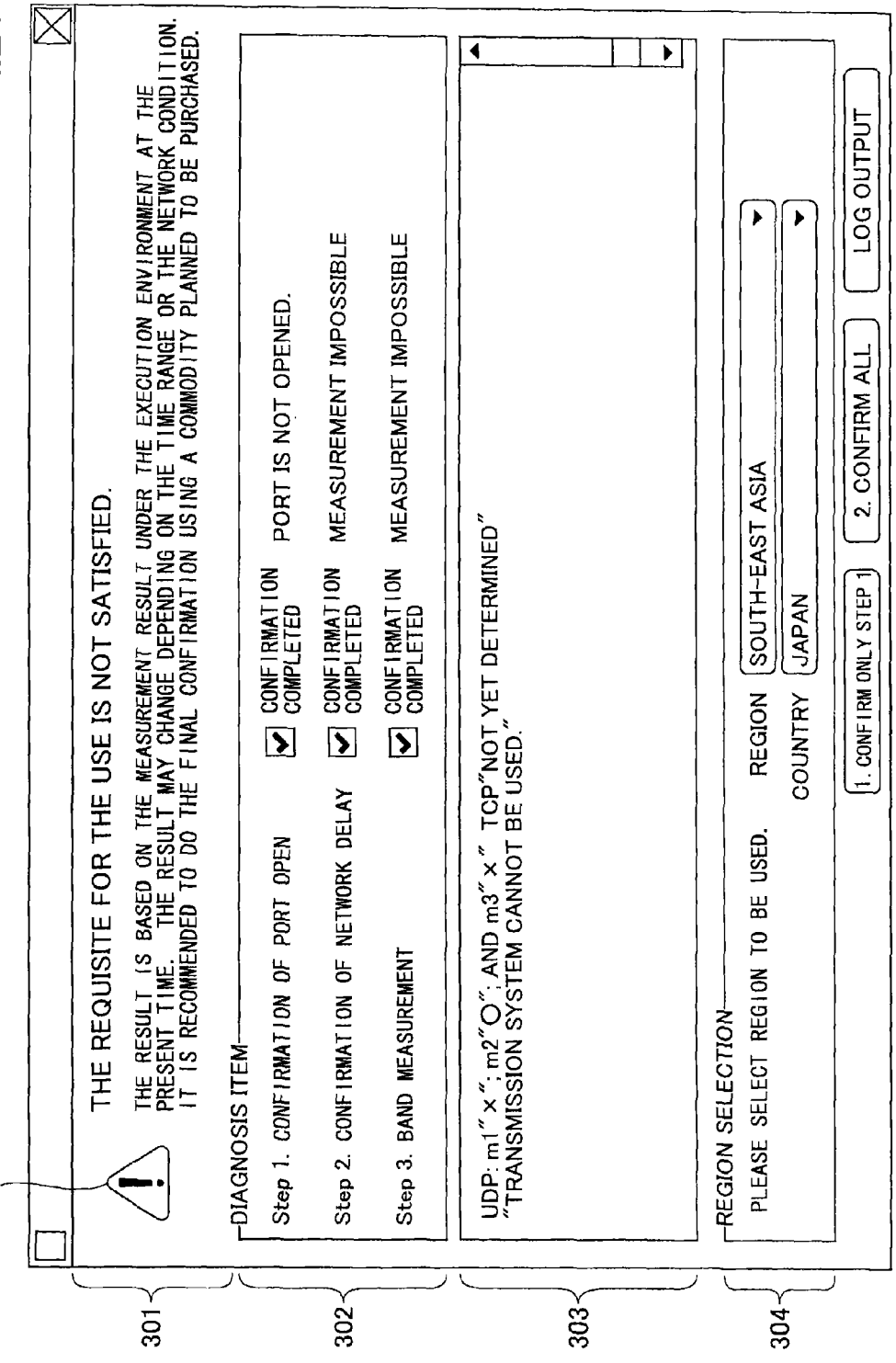

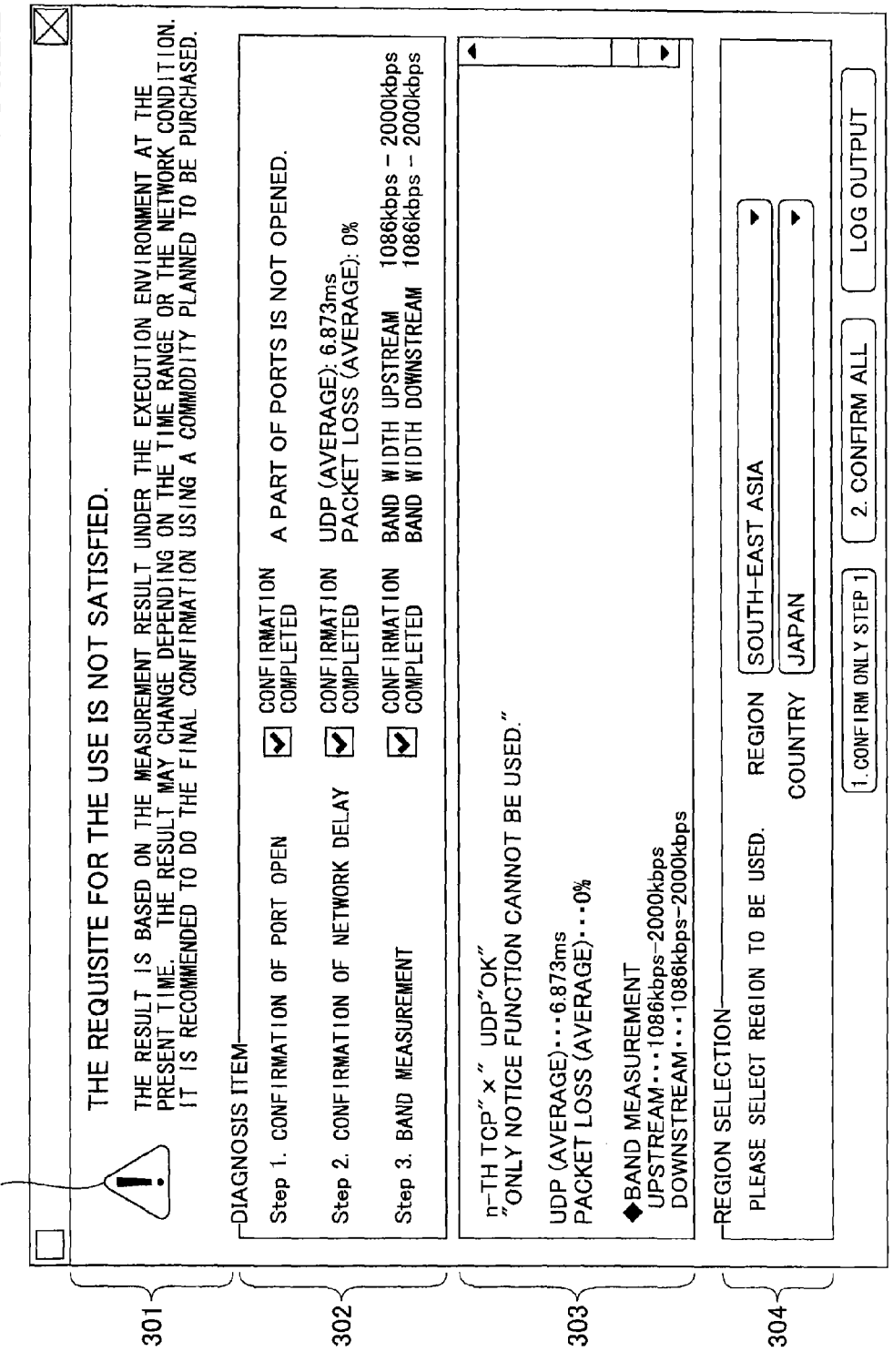

INFORMATION PROCESSING APPARATUS AND DETERMINATION RESULT PROVIDING METHOD

TECHNICAL FIELD

The present invention relates to an information processing apparatus providing a determination result of a communication environment or the like.

BACKGROUND ART

A transmission system for conducting conferences, in which multiple transmission terminals at remote locations communicate via a communication network such as the Internet, are being widely used. One utilization mode of the transmission system is a remote conference system, in which a transmission terminal captures an image of a user and collects voice sound such as an utterance, converts the captured image and the collected voice to digital data, and sends the digital data to a counterpart transmission terminal. The counterpart transmission terminal displays the sent image on a display of a conference room and causes the voice to be output from a speaker. Thus, the conference between remote places can be conducted as if an actual conference is conducted.

Because a small-sized transmission terminal and a general-purpose information processing apparatus having a function similar to the transmission terminal has started to be widely used, a conference can be held between counterparts not only at a specific location but also at a location where a connection with a network such as the Internet is available.

However, there is a case where a delay occurs in a transmission or reception of the image or voice depending on a communication environment where the conference is held. Therefore, examined is a technique of notifying the counterpart of whether the image or the voice is transmitted or received (for example, see Patent Document 1).

DISCLOSURE OF THE INVENTION

Problems to be Solved by the Invention

Here, data reach the counterpart via several routers in the communication via the network. Further, a port for specifying a program of receiving the data can be designated in the communication on the network. Although the router transfers the data by referring to a designated port, only a specific port necessary for the communication is opened among ports of the router in consideration of security in many cases. Said differently, an intrusion risk and an infection risk caused by a virus are reduced by not improperly opening the port. Because the router prevents the communication to the unopened port from being transferred into the inside of the router (on the side of the LAN), it is possible to maintain the side of the LAN to be a secure environment.

In the above-described remote conference system, the image and the voice are transmitted using a predetermined port. Therefore, if the predetermined port is closed, the conference cannot be conducted. The user determines that the conference cannot be conducted in a case where the image or the voice is not transmitted between transmission terminals at remote places. However, a reason why the image or the voice is not transmitted may be other than a case where the port is closed. Therefore, it is considered to use a check tool for examining whether the port is opened.

It is possible to properly know whether the port used by the remote conference system is opened by designating the port and examining by the check tool whether the designated port is opened.

However, the remote conference system selectively uses multiple communication protocols in response to a communication content. Therefore, there is a problem that information indicative of whether the remote conference system is available cannot be accurately provided for the user by examining only whether a single port is opened.

The object of the present invention is to provide a program for accurately providing a determination result indicative of whether the transmission system is available to the user in consideration of the above problem.

Means for Solving Problems

The present invention provides an information processing apparatus including a determination unit configured to determine whether a first communication port used by a first communication protocol is available and whether a second communication port used by a second communication protocol is available; and a determination result display unit configured to display a determination result for the first communication port and a determination result for the second communication port individually on a display unit.

Effect of the Invention

It is possible to provide an information processing apparatus accurately providing a determination result indicative of whether a transmission system is available to a user.

BRIEF DESCRIPTION OF DRAWINGS

FIG. 8 is a schematic view of a relay terminal management table.

FIG. 9 is a schematic view indicative of a terminal authentication management table.

FIG. 10 is a schematic view of a terminal status management table.

FIG. 11 is a schematic view of a destination list management table.

FIG. 12 is a schematic view of a session management table.

FIG. 13 is a schematic view of an application availability management table.

FIG. 20 illustrates an example of a check result screen displayed in a case where both of TCP and UDP are available.

FIG. 21 illustrates an example of a check result screen displayed in a case where UDP is not available.

FIG. 22 illustrates an example of a check result screen displayed in a case where only TCP is not available.

BEST MODE FOR CARRYING OUT THE INVENTION

Embodiments of the present invention are explained with reference to drawings.

Supplement of the Object

Figure 1:
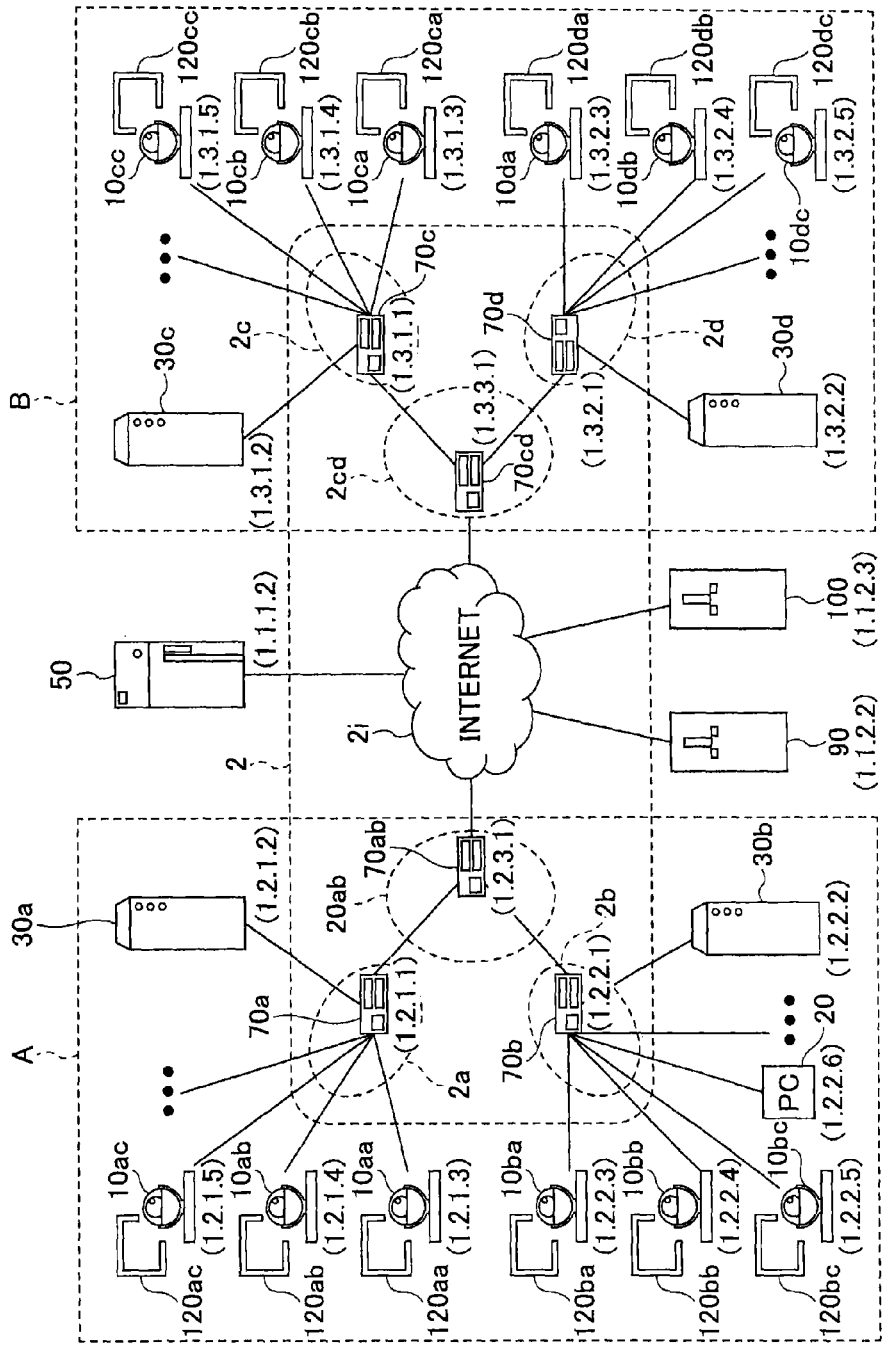
FIG. 1 is a schematic view of a transmission system of an embodiment of the present invention.

FIG. 1 is a schematic view of a transmission system of an embodiment of the present invention. At first, the object of the transmission system 1 of the embodiment is supplementally added.

In the transmission system 1, the routers 70a, 70b, 70c, and 70d have a function as a router for determining a route, and especially routers 70ab and 70cd have a function as a firewall for preventing an intrusion via the Internet, an infection by a virus, or the like. Specifically, in the routers 70ab and 70cd, only a port corresponding to a protocol minimally necessary for the communication is opened, and a port corresponding to a communication protocol (hereinafter, simply referred to as a protocol) with a high infection risk is not opened (a communication arriving from outside is discarded. With this, it is possible to prevent an intrusion inside a LAN and an infection risk in an apparatus connected to the LAN.

Therefore, as the number of the opened ports is smaller, the security is improved more. If the port corresponding to the protocol for sending the image or the voice is not opened, the transmission terminal 10 cannot transmit the image or the voice beyond the routers 70a, 70b, 70c, and 70d. Said differently, the user cannot use the transmission system 1.

If the user uses the check tool to determine whether the port used by the transmission system 1 is available in advance, it is possible to accurately determine whether the transmission system 1 is available. However, the following inconvenience occurs in a case where the transmission system 1 uses multiple protocols. A case where the transmission system 1 used two protocols is described as an example. A first protocol is a protocol for controlling transmissions of the image and the voice in use of a first port. A second protocol is a protocol for transmitting and receiving notification information such as information for a user of the transmission terminal 10 and control information of the transmission terminal 10 (hereinafter, the notification information and the control information are simply referred to as management information) in use of a second port.

A necessary condition for a remote conference conducted by the user while using the transmission system 1 is the opening of the first port. On the other hand, in many cases where the second port is closed, the transmission system 1 is available. However, there may be a rare case where the use becomes difficult or the function is partly unusable.

As described above, because the remote conference can be conducted even in the case where the second port is closed, the user may require to know the determination results by using the check tool respectively for the first port and the second port.

However, by the conventional technique, the determination result by the check tool is provided without distinguishing the first port and the second port. Therefore, there is an inconvenience that the user cannot determine whether either one of the first and second ports is not opened or both of the first and second ports are not opened. Further, there is an inconvenience that the user inevitably gives up a use of the transmission system 1 even if the second port opens to enable actually using the transmission system 1.

Overall Configuration of Embodiment

Described below is a transmission system 1 illustrated in FIG. 1. As illustrated in FIG. 1, the transmission system 1 includes multiple transmission terminals (10aa, 10ab, . . . ); displays (120aa, 120ab, . . . ) respectively for the multiple transmission terminals (10aa, 10ab, . . . ); a PC (personal computer) 20; multiple relay terminals (30a, 30b, 30c, 30d), a transmission management system 50, a program providing system 90, and a maintenance system 100. The transmission system 1 conducts a communication of call data such as image data and audio data to conduct a teleconference between remote locations. The transmission system 1 also includes multiple routers (70a, 70b, 70c, 70d, 70ab, and 70cd) that are configured to select an optimal path for the call data. The PC 20 is an information processing apparatus executing a check tool application described later. The PC 20 determines whether predetermined ports of the routers 70b and 70ab are opened and provides the determination result. The check tool application may be installed in the transmission terminal or used in common with the information processing apparatus. Within the embodiment, described is an example case where the transmission terminal 10 executes the check tool application.

Further, the transmission terminals (10aa, 10ab, 10ac, . . . ), the relay terminal 30a, and the router 70a are connected so as to be communicable by a LAN 2a. The transmission terminals (10ba, 10bb, 10bc, . . . ), the PC 20, the relay terminal 30b, and the router 70b are connected so as to be communicable by a LAN 2b. Further, the LAN 2a and the LAN 3b are connected so as to be communicable by a dedicated line 2*ab* including the router 70*ab*. Further, the LAN 2*a*, the LAN 2*b*, and the dedicated line 2*ab* are configured inside a predetermined region A. For example, the region A is China, the LAN 2*a* may be configured within an office located in Beijing, and the LAN 2*b* may be configured within an office located in Shanghai.

Further, the transmission terminals (10*ca*, 10*cb*, 10*cc*, . . . ), the relay terminal 30*c*, and the router 70*c* are connected so as to be communicable by a LAN 2*c*. The transmission terminals (10*da*, 10*db*, 10*dc*, . . . ), the relay terminal 30*d*, and the router 70*d* are connected so as to be communicable by a LAN 2*d*. Further, the LAN 2*c* and the LAN 3*d* are connected so as to be communicable by a dedicated line 2*cd* including the router 70*cd*. Further, the LAN 2*c*, the LAN 2*d*, and the dedicated line 2*cd* are configured inside a predetermined region B. For example, the region B is U.S.A., the LAN 2*c* may be configured within an office located in New York, and the LAN 2*d* may be configured within an office located in Washington D. C. The region A and the region B are connected so as to be communicable respectively through the routers (70*ab*, 70*cd*) via the Internet 2*i*.

Hereinafter, an arbitrary transmission terminal among the multiple transmission terminals (10*aa*, 10*ab*, . . . ) is indicated as a "transmission terminal 10", an arbitrary display among the multiple displays (120*aa*, 120*ab*, . . . ) is indicated as a "display 120", and an arbitrary relay terminal among the multiple relay terminals (30*a*, 30*b*, 30*c*) is indicated as a "relay terminal 30". Further, the transmission terminal as a requesting source of requesting to start the teleconference is indicated as a "requesting terminal", and the transmission terminal as a requesting destination (a relay destination) is indicated as a "destination terminal".

An arbitrary router among the multiple routers (70*a*, 70*b*, 70*c*, 70*d*, 70*ab*, 70*cd*) is indicated as a "router 70".

This call is actually conducted using a sound, a video image (an image), or the sound and the video image (the image).

The transmission management system 50, the program providing system 90, and the maintenance system 100 are connected to the Internet 2*i*. The transmission management system 50, the program providing system 90, and the maintenance system 100 may be located in the region A, the region B, or another region.

Within the embodiment, the communication network 2 of the embodiment is configured by the LAN 2*a*, the LAN 2*b*, the dedicated line 2*ab*, the Internet 2*i*, the dedicated line 2*cd*, the LAN 2*c*, and the LAN 2*d*. This communication network 2 is not limited to be wired and may include a part where a wireless communication such as the 3G, the LTE (Long Term Evolution), the WiFi (Wireless Fidelity), and Bluetooth ("Bluetooth" is a registered trademark) is used.

Further, referring to FIG. 1, a set of four numbers attached below each of the transmission terminals 10, the PC 20, the relay terminals 30, the transmission management system 50, the routers 70, the program providing system 90, and the maintenance system 100 is an IP address (a simplified IP address) in the ordinary IPv4. For example, the IP address of the transmission terminal 10*aa* is "1.2.1.3". Although the IPv6 may be used instead of the IPv4, the IPv4 is used in the present example to simplify the explanations.

The transmission terminals 10 may be used to establish a call between multiple offices, a call between different rooms within the same office, a call within the same room, a call between the outdoors and indoors, and a call other than the call between the outdoors and indoors. In the case where transmission terminals 10 are used outdoors, a wireless communication may be conducted using a mobile telephone communication network or the like.

Further, when a teleconference application (described below) is started up, the transmission terminals 10 enable a call for the user by transmitting and receiving call data. The transmission terminals 10 are a teleconference terminal, for example. The transmission terminal 10 is configured to transmit/receive call data using a predetermined communication system (a call control system for connecting to or disconnecting from a call destination, and a coding system for converting call data into IP packets). In the following descriptions, "application" may be abbreviated to "app".

The above call control system includes (1) the SIP (Session Initiation Protocol), (2) the H.323, (3) an extension to the SIP, (4) an instant messaging protocol, (5) a protocol using the SIP MESSAGE method, (6) the IRC (Internet Relay Chat) protocol, and (7) an extension to an instant messaging protocol, and so on. Here, (4) the instant messaging protocol is a protocol used by (4-1) the XMPP (Extensible Messaging and Presence Protocol), and (4-2) protocols used by ICQ ("ICQ" is a registered trademark), AIM ("AIM" is a registered trademark), and Skype ("Skype" is a registered trademark), for example. An example of an extension of (7) the instant messaging protocol includes the Jingle.

In a case where the multiple transmission terminals 10 use the same call app, these transmission terminals 10 may conduct a call with each other via the communication network 2. Here, the call app include a call and message app, a call app for a teleconference, Skype, Google Talk, LINE, Kakao Talk, and Tango ("Skype", "Google Talk", "LINE", "Kakao Talk", and "Tango" are registered or unregistered trademarks), for example.

Figure 2:
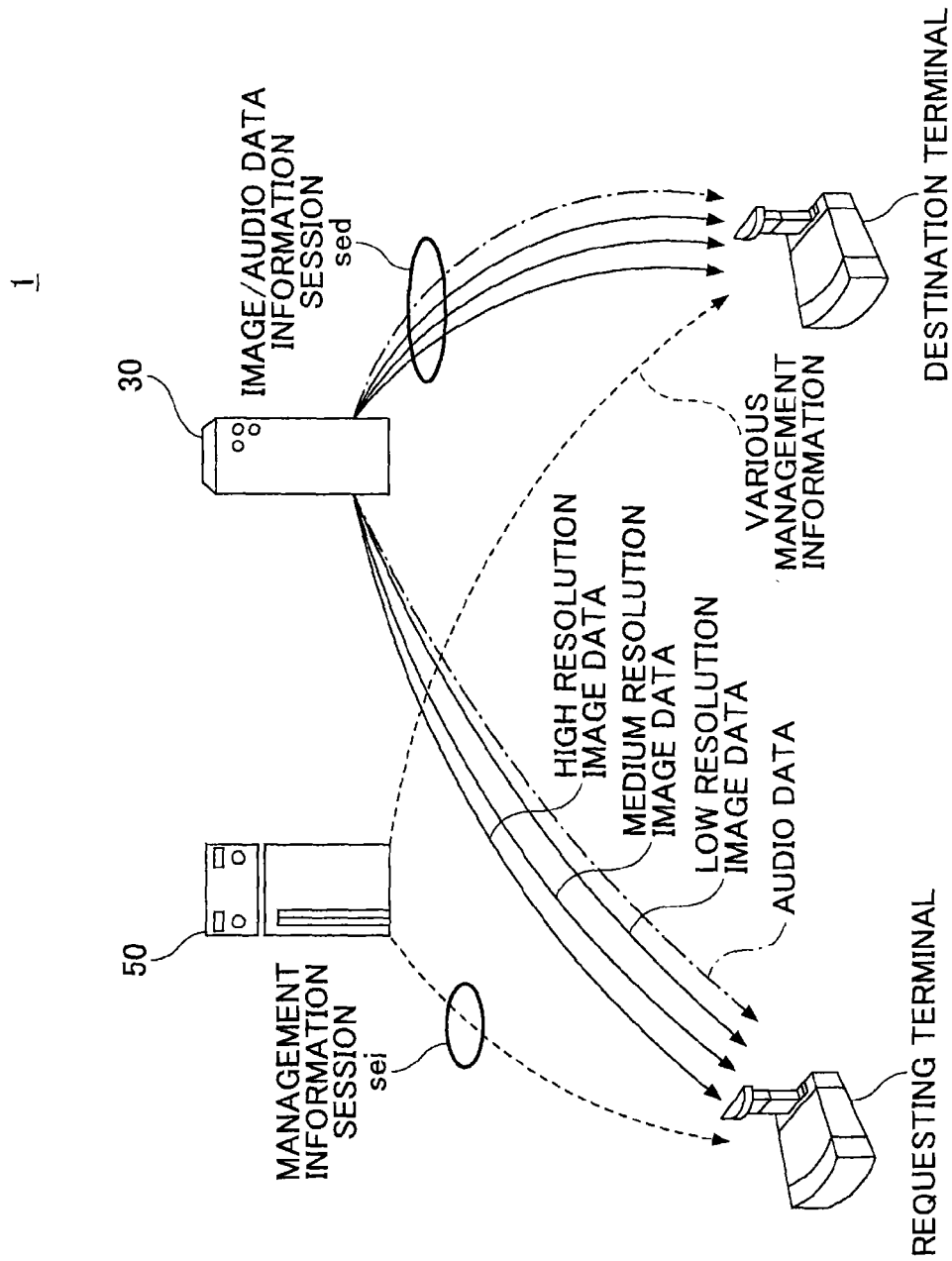
FIG. 2 illustrates an example of explaining a session established between a requesting terminal and a destination terminal.

Further, as illustrated in FIG. 2, in the transmission system 1, a management information session sei is established between the requesting terminal and the destination terminal to enable the transmission and receipt of various management information via the transmission management system 50. Also, four sessions may be established between the requesting terminal and the destination terminal to enable the transmission and receipt of four data including high-resolution image data, medium-resolution image data, low-resolution image data, and audio data via the relay terminal 30. The above four sessions are collectively represented as an "image/audio data session sed".

Because the protocol for the management information session sei differs from the protocol for the image/audio information session sed, ports used by the management information session sei and the image/audio information session sed are also different. The protocol used by each of the sessions may not be singular, and the single protocol may use multiple ports.

Figure 3A:
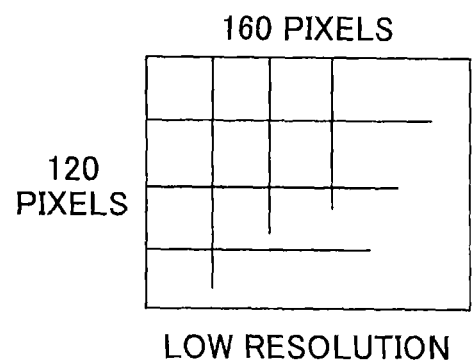
FIG. 3A illustrates an example of explaining a resolution of an image of image data.
Figure 3B:
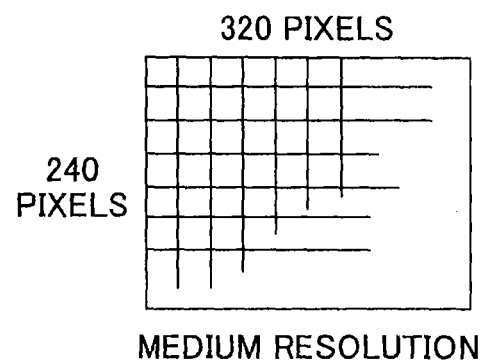
FIG. 3B illustrates an example of explaining a resolution of an image of image data.
Figure 3C:
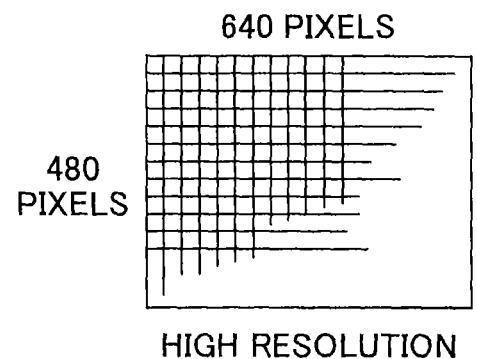
FIG. 3C illustrates an example of explaining a resolution of an image of image data.

Here, the resolution of the image of the image data is described. FIGS. 3A-3C are schematic views illustrating the image qualities of the image data transmitted and received using the SVC (Scalable Video Coding) standard in FIG. 2.

FIG. 3A illustrates a low-resolution image having 160 pixels wide and 120 pixels high as a base image, FIG. 3B illustrates a medium-resolution image having 320 pixels wide and 240 pixels high, and FIG. 3C illustrates a high-resolution image having 640 pixels wide and 480 pixels high. In the case of transmitting and receiving the image data using a narrow band path, low-quality image data made by only the low-resolution image data of the base image are relayed. In the case where a relatively wide band is used, the low-resolution image data of the base image and medium-quality image data made by the medium-resolution image are relayed. In the case where a substantially wide band is used, the low-resolution image data, the medium-resolution image data, and high-quality image data made by the high-resolution image are relayed. Because the data quantity of audio data is smaller than the data quantity of image data, the audio data are relayed via the narrow band path regardless of whether a narrow band, a relatively wide band, or a substantially wide band is used in the communications network 2.

Hardware Configuration of Embodiment

Figure 4:
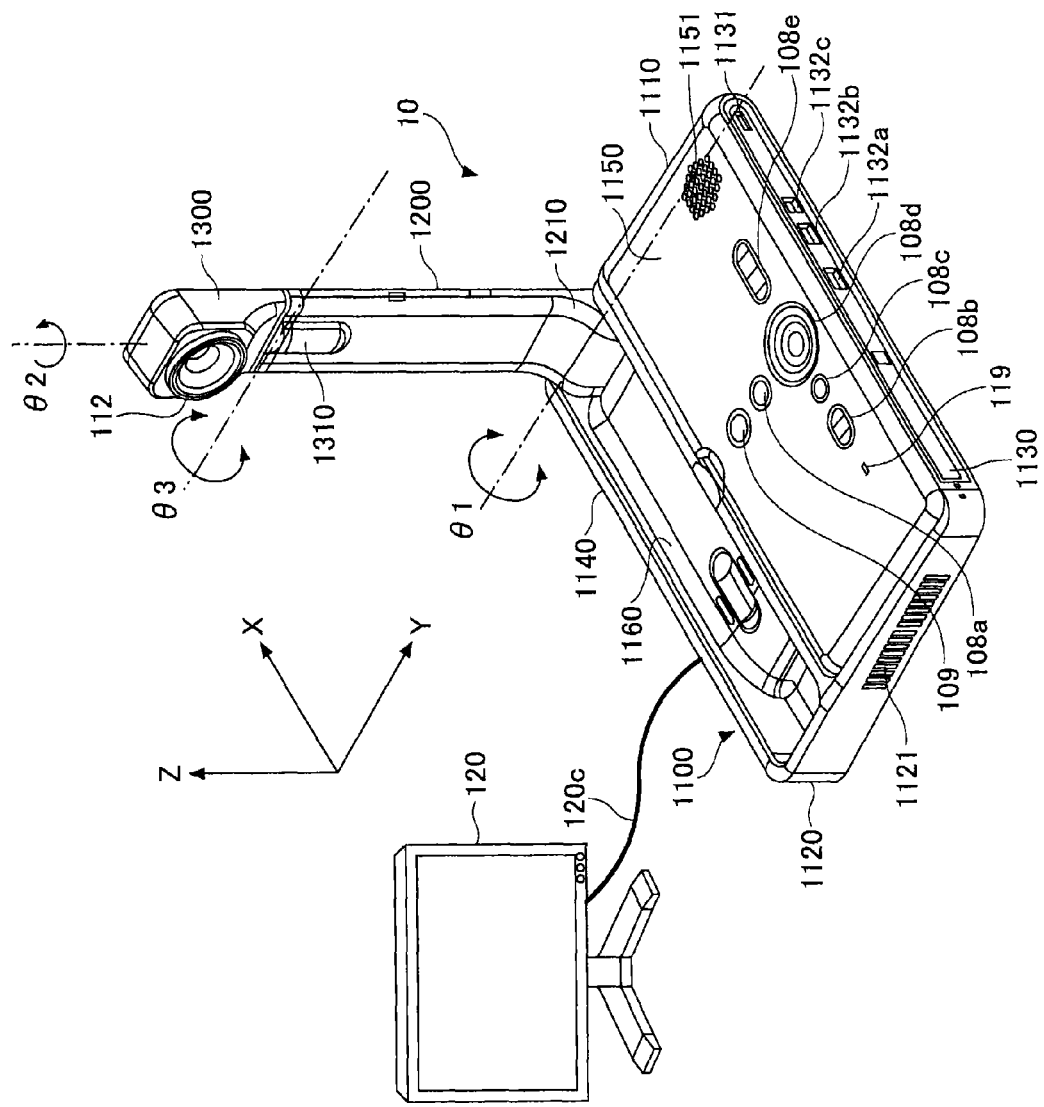
FIG. 4 illustrates an exemplary outer appearance of a transmission terminal.

FIG. 4 illustrates an exemplary outer appearance of the transmission terminal 10 of the present embodiment. As illustrated in FIG. 4, the transmission terminal 10 includes a casing 1100, an arm 1200, and a camera housing 1300. An air inlet face including multiple air inlet holes (not shown) is arranged at a front side face of the casing 1100, and an exhaust face 1121 including multiple exhaust holes is arranged at a rear side wall 1120 of the casing 1100. In this way, when a cooling fan built inside the casing 1100 is driven, external air at the front side of the transmission terminal 10 may be introduced via the air inlet face (not shown) and discharged at the rear side of the transmission terminal 10 via the exhaust face 1121. Also, an audio pickup hole 1131 is arranged at a right side wall 1130 of the casing 1100, and audio such as voice, sound, and noise may be picked up by a built-in microphone 114 (described below).

An operation panel 1150 is arranged on a side of the right wall surface 1130. On the operation panel 1150, multiple operation buttons (108a-108e) (described below), a power switch 109 (described below), an alarm lamp 119 (described below), and an audio output face 1151 including multiple audio output holes for causing audio output from a built-in speaker 115 (described below) to pass therethrough are arranged. An accommodating portion 1160 corresponding to a concave portion for accommodating the arm 1200 and the camera housing 1300 is arranged on the side of a left side wall 1140 on the casing 1100. Multiple connection ports (1132a-1132c) for electrically connecting a cable with an external device connection I/F 118 (described below) are arranged at the right side wall 1130 of the casing 1100. A connection port (not shown) for electrically connecting a cable 120c for the display 120 to the external device connection I/F 118 is arranged at the left side wall 1140 of the casing 1100.

In the following description, an arbitrary operation button among the multiple operation buttons (108a-108e) may simply be referred to as "operation button 108", and an arbitrary connection port among the connection ports 1132a-1132c may simply be referred to as "connection port 1132".

Next, the arm 1200 is attached to the casing 1100 through a torque hinge 1210 so that the arm 1200 can rotate in an up-down direction, within a tilt angle θ1 range of 135 degrees, with respect to the casing 1100. FIG. 4 illustrates a state in which the tilt angle θ1 is 90 degrees. A built-in camera 12 (described below) is built inside the camera housing 1300 and is capable of capturing images of users, documents, and the interior of a room, for example. Further, a torque hinge 1310 is formed in the camera housing 1300. The camera housing 1300 is attached to the arm 1200 via the torque hinge 1310. The camera housing 1300 is configured to be rotatable horizontally within a panning angle θ2 range of ±180 degrees with respect to the state (0 degrees) illustrated in FIG. 4, and the camera housing 1300 is configured to be rotatable vertically within a tilt angle θ3 range of ±45 with respect to the arm 1200.

The view of the outer appearance in FIG. 4 is merely one example, and the outer appearance is not limited thereto. The transmission terminal 10 may be a general-purpose PC, a smartphone, or a tablet terminal, for example. The camera and the microphone are not necessarily built-in devices but may instead be externally attached to the transmission terminal 10.

The outer appearances of the transmission management system 50, the PC 20, the program providing system 90, and the maintenance system 100 may be substantially identical to the outer appearances of ordinary server computers. Thus, descriptions of the outer appearances are omitted.

Figure 5:
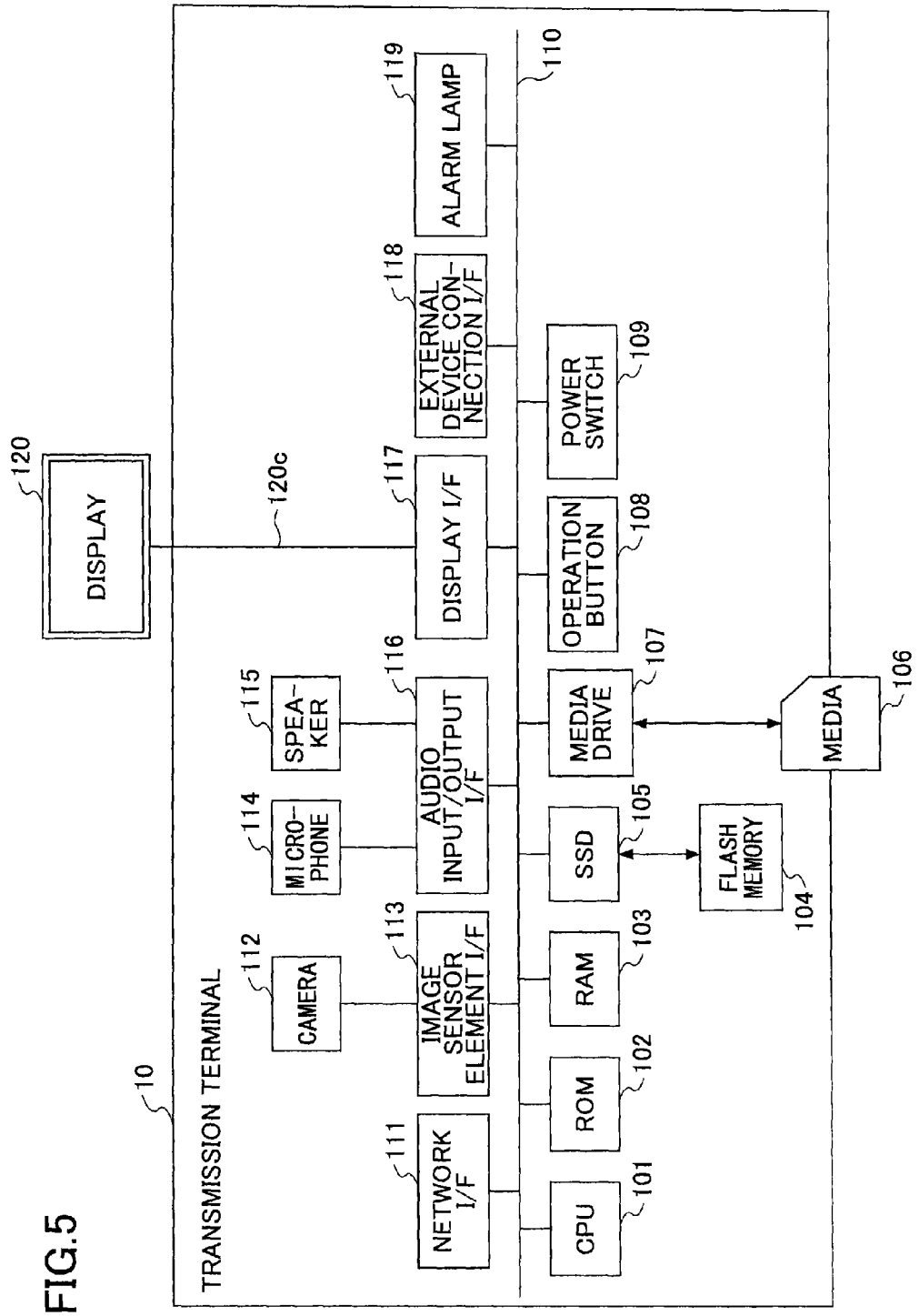
FIG. 5 illustrates an exemplary hardware structure of the transmission terminal of the embodiment.

FIG. 5 illustrates an exemplary hardware structure of the transmission terminal 10 of the embodiment. The transmission terminal 10 illustrated in FIG. 5 includes a central processing unit (CPU) 101 controlling an overall operation of the transmission terminal 10, a read only memory (ROM) 102 storing a program such as IPL (Initial Program Loader) used to drive the CPU 101, a random access memory (RAM) 103 used as a work area for the CPU 101, a flash memory 104 storing a program for the transmission terminal 10 and various data such as the image data and the audio data, a solid state drive (SSD) 105 controlling to read or write the various data from or to the flash memory 104, a media drive 107 controlling to read or write (store) the data from or to media 106 such as the flash memory, the operation button 108 operated in a case where the destination for the transmission terminal 10 is selected, the power switch 109 for switching over ON/OFF of a power source of the transmission terminal 10, and a network interface (I/F) 111 for conducting data transmission using the communication network 2.

Further, the transmission terminal 10 includes the built-in camera 112 capturing an image of an object in conformity with a control by the CPU 101 and obtain image data, an image sensor element I/F 113 controlling drive operations of the camera built-in 112, the microphone 114 for inputting voice, a built-in speaker 115 for outputting voice, an audio input/output I/F 116 for inputting and outputting the audio signal between the microphone 114 and the speaker 115 in conformity with the control by the CPU 101, a display I/F 117 transmitting the image data to an external display 120 in conformity with the control by the CPU 101, the external device connection I/F 118 for connecting various external devices, and the alarm lamp 119 for notifying an abnormality of various functions of the transmission terminal 10, and a bus line 110 such as an address bus and a data bus for electrically connecting the above components as illustrated in FIG. 5.

The display 120 is a display unit formed by liquid crystal or organic electroluminescence (EL) for displaying the image of the object or an operation screen, for example. The display 120 is connected to the display I/F 117 by a cable 120c. The cable 120c may be an analog RGB (VGA) cable, a component video cable, a HDMI (High-Definition Multimedia Interface) ("HDMI" is a registered trademark) cable, or a DVI (Digital Video Interactive) signal cable, for example.

The camera 112 includes a lens and a solid state image sensor that converts light into an electrical charge to digitize the image (the video image) of the object.

The external device connection I/F 118 may be electrically connected with an external device such as an external camera, an external microphone, or an external speaker by a cable such as a USB (Universal Serial Bus) cable that is coupled to the connection port 1132 of the casing 1100 illustrated in FIG. 4, for example. In a case where the external camera is connected, the CPU 101 may prioritize a drive operation of the external camera over the built-in camera 112. Similarly, in a case where an external microphone or an external speaker is connected to the external device connection I/F 118, the CPU 101 may prioritize a drive operation of the external microphone or the external speaker over the built-in microphone 114 or the built-in speaker 115.

Here, the media 106 may be attachable to or detachable from the transmission terminal 10. A non-volatile memory such as an EEPROM (Electrically Erasable and Programmable ROM), which reads or writes the data in conformity with the control of the CPU 101, may be used instead of the flash memory 104, for example.

Figure 6:
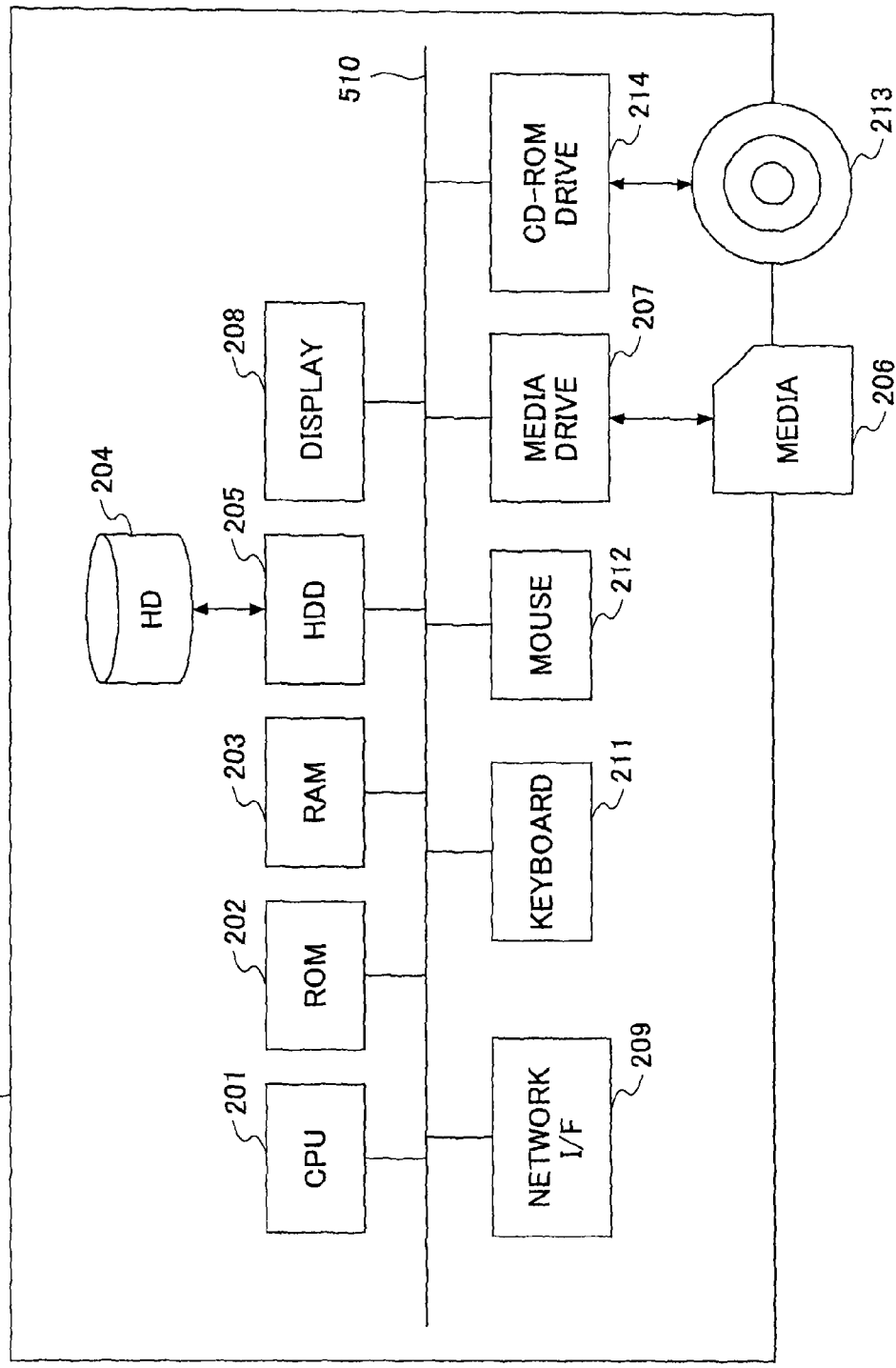
FIG. 6 illustrates an exemplary hardware structure of a transmission management system of the embodiment.

FIG. 6 illustrates an exemplary hardware structure of the transmission terminal 50 of the embodiment. The transmission management system 50 illustrated in FIG. 6 includes a CPU 201 controlling an overall operation of the transmission management system 50, a ROM 202 storing a program such as IPL used to drive the CPU 201, a RAM 203 used as a work area for the CPU 201, a hard disk (HD) 204 storing various data such as a program for the transmission management system 50, a hard disk drive (HDD) 205 controlling to read or write the various data from or to the HD 204, a media drive 207 controlling to read or write the data from or to the media 206 such as a flash memory, a display 208 displaying various information such as a cursor, a menu, a window, a character, or an image, a network I/F 209 for conducting data communication using the communication network 2, a keyboard 211 having multiple keys for inputting characters, numeric values, and various commands, a mouse 212 for selecting and/or executing a command, selecting an object to be processed, or moving the cursor, a CD-ROM drive 214 controlling a data read/write operation on a CD-ROM (Compact Disc Read-Only Memory) 213 as an exemplary attachable or detachable recording medium, and a bus line 510 such as an address bus and a data bus for electrically connecting the above components as illustrated in FIG. 6.

Meanwhile, the PC 20, the relay terminal 30, the program providing system 90, and the maintenance system 100 may have hardware configurations similar to that of the transmission management system 50. Therefore, descriptions thereof are omitted.

Functional Configuration of Embodiment

Figure 7:
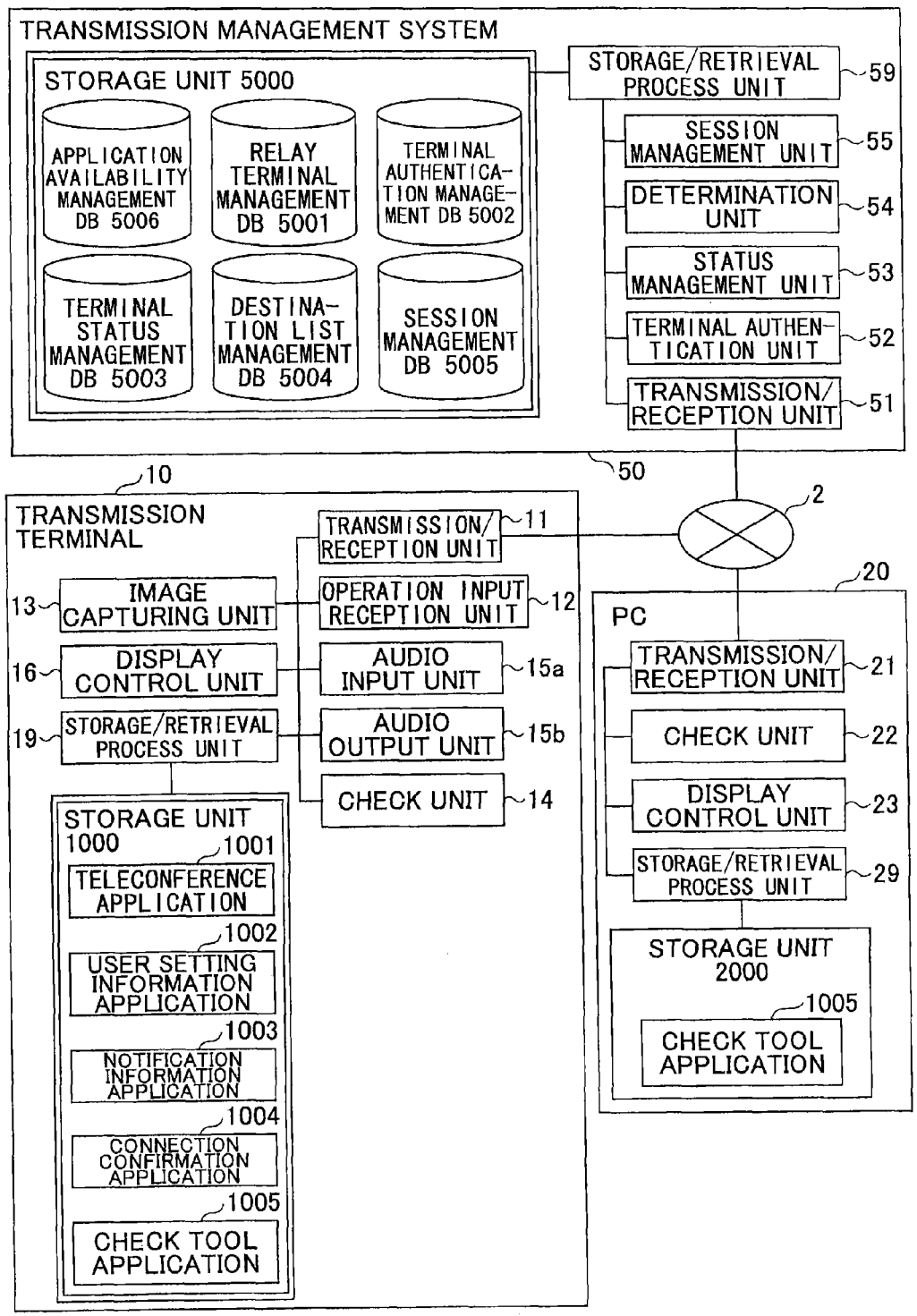
FIG. 7 is a functional block diagram of the transmission terminal, a PC, and the transmission management system, which form parts of the transmission system of the embodiment.

A functional configuration of the present embodiment is described. FIG. 7 is a functional block diagram of the transmission terminal 10, the PC 20, and the transmission management system 50, which form parts of the transmission system 1 of the embodiment. Referring to FIG. 7, the transmission terminal 10, the PC 20, and the transmission management system 50 are connected by the communications network 2 and are capable of conducting a data communication with each other via the communications network 2.

<Functional Configuration of Transmission Terminal>

The transmission terminal 10 includes a transmission/reception unit 11, an operation input reception unit 12, an image capturing unit 13, an audio input unit 15a, an audio output unit 15b, a display control unit 16, a check unit 14, and a storage/retrieval process unit 19. These parts are functions or means implemented when any one of the components illustrated in FIG. 5 operates in response to a command from the CPU 101 in conformity with the program for the transmission terminal 10 received from the flash memory 104 and expanded in the RAM 103.

Further, the transmission terminal 10 includes a storage unit 1000 that is configured by the RAM 103 illustrated in FIG. 5 and the flash memory 104 illustrated in FIG. 5.

(Functional Configurations of Transmission Terminal)

The transmission/reception unit 11 of the transmission terminal 10 illustrated in FIG. 7 is implemented by the command received from the CPU 101 illustrated in FIG. 5 and the network I/F 111 illustrated in FIG. 5. The transmission/reception unit 11 transmits and receives various data (or information) to and from the other transmission terminal, an apparatus, and a system via the communication network 2. This transmission/reception unit 11 starts to receive status information indicative of statuses of the transmission terminals as candidates of counterparties of the communication from the transmission management system 50 before starting calling a desired destination terminal.

Further, upon a receipt of the power on, the transmission/reception unit 11 automatically send login request information and the present IP address of the requesting transmission terminal to the transmission management system 50 via the communication network 2. When the user turns off the power switch 109 from ON to OFF, the operation input reception unit 12 completely turns off the power after the transmission/reception unit 11 sends status information indicating that the power is turned off to the transmission management system 50. Therefore, the transmission management system 50 can be informed that the power of the transmission terminal 10 is turned from ON to OFF. Here, the request for the login may not be sent in response to the power on but may be sent in response to an input of an instruction to the transmission terminal 10 by the user.

The operation input reception unit 12 is implemented by an order from the CPU 101 illustrated in FIG. 5 and receives various inputs by the user. For example, when the user turns on the power switch 109 of the transmission terminal, the operation input reception unit 12 illustrated in FIG. 7 receives the power on and turn on the power.

The image capturing unit 13 is implemented by the command from the CPU 101 illustrated in FIG. 5, and the camera 112 and the image sensor element I/F 113 illustrated in FIG. 5. The image capturing unit 13 captures an image of the object and outputs captured image data.

The audio input unit 15a is implemented by the command from the CPU 101 illustrated in FIG. 5 and the audio input/output I/F 116 illustrated in FIG. 5. After a voice of the user is converted to an audio signal by the microphone 114, the audio input unit 15a inputs audio data corresponding to the audio signal. The audio output unit 15b is implemented by the command from the CPU 101 illustrated in FIG. 5 and the audio input/output I/F 116 illustrated in FIG. 5. The audio output unit 15b outputs an audio signal corresponding to audio data to the speaker 115 so that a voice is output from the speaker 115.

The check unit 14 is implemented by the command from the CPU 101 illustrated in FIG. 5 and the network I/F 111 illustrated in FIG. 5. The check unit 14 determines whether the communication environment is appropriate in using the transmission system 1. The check unit 14 is implemented when the CPU 101 executes the check tool application 1005.

The display control unit 16 is implemented by the command from the CPU 101 illustrated in FIG. 5 and the display I/F 117 illustrated in FIG. 5. The display control unit 16 controls to combine image data captured by the image capturing unit 13 and image data received from the transmission terminal of the counterpart in the conference and send the combined image data to the display 120. The display control unit 16 causes the display 120 to display the determination result obtained by the check unit 14.

The storage/retrieval process unit 19 is implemented by the command from the CPU 101 illustrated in FIG. 5 and the SSD 105 illustrated in FIG. 5 or the command from the CPU 101. The storage/retrieval process unit 19 stores various data into the storage unit 1000 and retrieves the various data stored in the storage unit 1000. The storage unit 1000 stores a terminal ID (Identification) for identifying the transmission terminal 10, a password, and so on.

The image data and the audio data, which are received at every call with the destination terminal, are overwritten and stored every receipt of the image data and the audio data. Here, the image of the image data before being overwritten is displayed on the display 120, and the audio of the audio data before being overwritten is output by the speaker 115.

This storage unit 1000 stores a teleconference application 1001, a user setting information application 1002, a notification information application 1003, a connection confirmation application 1004, and a check tool application 1005. The teleconference application is an application for conducting the teleconference. The user setting information application 1002 is an application for displaying information necessary when a user of the transmission terminal 10 conducts an initial setup. For example, a wired network setting method, a wireless network setting method, a network connection test method, a firmware update method, or the like is displayed. The user setting information is managed by the transmission management system 50 in association with a terminal ID and is transmitted from the transmission management system 50.

The notification information application 1003 is an application for displaying information such as a service stop time of the system and a program update, which is notified to the user. The notification information is managed by the transmission management system 50 in association with a terminal ID and is transmitted from the transmission management system 50. The connection confirmation application 1004 causes a screen (not illustrated) of a connection confirmation to be displayed on the display 120. When the user conducts an operation of "connection confirmation", the connection confirmation application 1004 causes an captured image of the counterpart to be displayed on the display 120 and simultaneously causes an image of the own to be displayed so as to confirm a connection with a counterpart terminal.

The check tool application 1005 is an application for examining whether a port of the router 70 used by the transmission system 1 is opened and displaying a check result of the examination. The detailed explanation is given later.

The terminal ID of this embodiment and a relay terminal ID described later indicate identification information such as a language, characters, symbols, or various marks used to uniquely identify the transmission terminal 10 and the relay terminal 30, respectively. The terminal ID and the relay terminal ID may also be a combination of two or more of the languages, the characters, the symbols, or the various marks, for example.

<PC>

The PC 20 includes a transmission/reception unit 21, a check unit 22, a display control unit 23, and a storage/retrieval process unit 29. These parts are functions or means implemented when anyone of the components illustrated in FIG. 6 operates in response to a command from the CPU 101 in conformity with the check tool application 1005 received from the flash memory 104 and expanded in the RAM 103.

The transmission/reception unit 21, the check unit 22, and the display control unit 23 have the same functions as those of the transmission/reception unit, the check unit, and the display control unit of the transmission terminal 10, respectively. This is because the PC 20 is connected to the communication network 2 mainly to examine the communication environment.

The PC 20 includes a storage unit 2000 that is configured by the RAM 203 illustrated in FIG. 6 and the HD illustrated in FIG. 6. The storage unit 2000 stores the check tool application 1005. Because it is enabled to examine whether there is an appropriate communication environment, the user can examine the communication environment by the PC 20 without carrying the transmission terminal 10. The check tool application 1005 can be downloaded from a program providing system 90.

<Functional Configuration of Transmission Management System>

The transmission management system 50 includes a transmission/reception unit 51, a terminal authentication unit 52, a status management unit 53, a determination unit 54, a session management unit 55, and a storage/retrieval process unit 59. These parts are functions or means implemented when any one of the components illustrated in FIG. 5 operates in response to a command from the CPU 201 in conformity with a program for the transmission management system 50 received from the HD 504 and expanded in the RAM 203. Further, the transmission management system 50 includes a storage unit 5000 that is configured by the HD 204. The storage unit 5000 stores DBs (5001, 5002, 5003, 5004, and 5005) formed by various tables described below.

(Relay Terminal Management Table)

FIG. 8 is a schematic view of a relay terminal management table. The storage unit 5000 stores a relay terminal management DB 5001 formed by a relay terminal management table as illustrated in FIG. 8. In this relay terminal management table, operation states of the various relay terminals 30, dates and times received when the status information indicative of the operation states, IP addresses of the relay terminals, and the maximum data transmission speeds (Mbps) of the relay terminals 30 are managed mutually in association for each relay terminal ID of the relay terminals 30.

(Terminal Authentication Management Table)

FIG. 9 is a schematic view of a terminal authentication management table. The storage unit 5000 stores a terminal authentication management DB 5002 formed by a terminal authentication management table as illustrated in FIG. 9. The terminal authentication management table manages an authentication password in association with each terminal ID of all the transmission terminals 10 managed by the transmission management system 50. (Terminal Status Management Table)

FIG. 10 is a schematic view of a terminal authentication management table. The storage unit 5000 stores a terminal status management DB 5003 formed by a terminal status management table as illustrated in FIG. 10. The terminal status management table manages, for each terminal ID of the transmission terminals 10, types of the transmission terminals, destination names when the transmission terminals are destinations, operation states of the transmission terminals 10, dates and times received when a login request (described below) is received by the transmission management system 50, and IP address of the transmission terminals, mutually in association. The terminal IDs, the types of the transmission terminals, and the destination names are stored and managed at a time of registering these in the transmission management system 50 because the transmission terminals 10 communicate by using the transmission system 1.

(Destination List Management Table)

FIG. 11 is a schematic view of a destination list management table. The storage unit 5000 stores a destination list management DB 5004 formed by a destination list management table as illustrated in FIG. 11. In this destination list management table, the terminal IDs of the requesting terminals requesting a start of call are managed in thoroughly association with the terminal IDs of the destination terminals registered as a candidate of a communication counterpart. This candidate of the communication counterpart is updated when the candidate is added or deleted upon a request the transmission management system 50 to add or delete the candidate from an arbitrary requesting terminal.

(Session Management Table)

FIG. 12 is a schematic view of a session management table. The storage unit 5000 stores a session management DB 5005 formed by a session management table as illustrated in FIG. 12. The session management table manages a relay terminal ID of a relay terminal 30 used to relay the call data (the image data and the audio data), the terminal ID of the requesting terminal, the terminal ID of the destination terminal, the delay time (ms) of receiving the image data in the destination terminal, and the date and time received by the transmission management system 50 in association with delay time information indicative of a delay time sent from the destination terminal while mutually associating these. When the call is conducted between the two transmission terminals 10, the date and time received of the delay time information may be managed based on the delay time information sent not from the destination terminal but from the requesting terminal. However, the call is conducted among at least three transmission terminals 10, the date and time received of the delay time information is managed based on the delay time information transmitted from the transmission terminal 10 on the receipt side of the image data and the audio data.

(Application Availability Management Table)

FIG. 13 is a schematic view of an application availability management table. The storage unit 5000 stores an application availability management DB 5006 formed by the application availability management table as illustrated in FIG. 12. This application availability management table manages application availability information indicating that each application is available (On) or unavailable (Off) in the transmission terminal 10 for each terminal ID for identifying the transmission terminals 10 and each application ID for identifying multiple applications installed in the transmission terminal 10. For example, in the application availability management table illustrated in FIG. 13, it is indicated that at least one of 5 types of applications having application IDs "a001", "a002", "a003", "a004", and "a005" can be simultaneously used (started up) in the transmission terminal 10*aa* having the terminal ID "01aa". This application IDs correspond to the teleconference application 1001, the user setting information application 1002, the notification information application 1003, the connection confirmation application 1004, and the check tool application 1005, one-to-one.

<Various Functional Configurations of Transmission Management System>

Described next in detail are various functional configurations of the transmission management system 50. The transmission/reception unit 51 operates by receiving a command from the CPU 201, 501 illustrated in FIG. 6 and through the network I/F 209, 509 illustrated in FIG. 6, and transmits and receives various data (or information) to and from another transmission terminal, a device, or a system through the communication network 2.

The terminal authentication unit 52 is implemented by a command from the CPU 201, 501 illustrated in FIG. 6. The terminal authentication unit 52 searches the terminal authentication management table using the terminal ID and the password, which are included in login request information received through the transmission/reception unit 51, and conducts a terminal authentication by determining whether the same terminal ID and the same password are managed in the terminal authentication management table.

The status management unit 53 is implemented by a command from the CPU 201, 501 illustrated in FIG. 6. The status management unit 53 stores and manages the terminal ID of the requesting terminal, the operation state of the requesting terminal, the date and time received when the login request information is received in the transmission management system 50, and the IP address of the requesting terminal in the terminal status management table, while associating these so as to manage the operation state of the requesting terminal, from which the login is requested. The status management unit 53 changes the operation state indicating the online of the terminal status management table to the offline based on status information, which indicates that the power is turned off and is sent from the transmission terminal 10.

The determination unit 54 is implemented by a command from the CPU 201, 501 illustrated in FIG. 6. The determination unit 54 determines whether the operation state indicated by operation state information is "online". Further, in a case where it is determined that the operation state is "online", the determination unit 54 determines that the operation state information can be sent to a predetermined transmission terminal 10. In a case where it is determined that the operation state is not "online", the determination unit 54 determines that the operation state information cannot be sent to the predetermined transmission terminal 10.

The session management unit 55 is implemented by a command from the CPU 201, 501 illustrated in FIG. 6. The session management unit 55 stores and manages the relay terminal ID of the relay terminal 30 used to relay the call data, the terminal ID of the requesting terminal, the terminal ID of the destination terminal, the delay time (ms) of the receipt when the image data are received by the destination terminal, and delay time information indicative of the delay time in the session management table of the storage unit 5000 while associating these. The session management unit 55 creates a session ID used to establish a communication session.

The storage/retrieval process unit 59 is implemented by the command from the CPU 201, 501 illustrated in FIG. 6 and the HDD 205, 505 illustrated in FIG. 6. The storage/retrieval process unit 59 stores various data into the storage unit 5000 and retrieves the various data stored in the storage unit 5000.

Process or Operation of Embodiment

Figure 14:
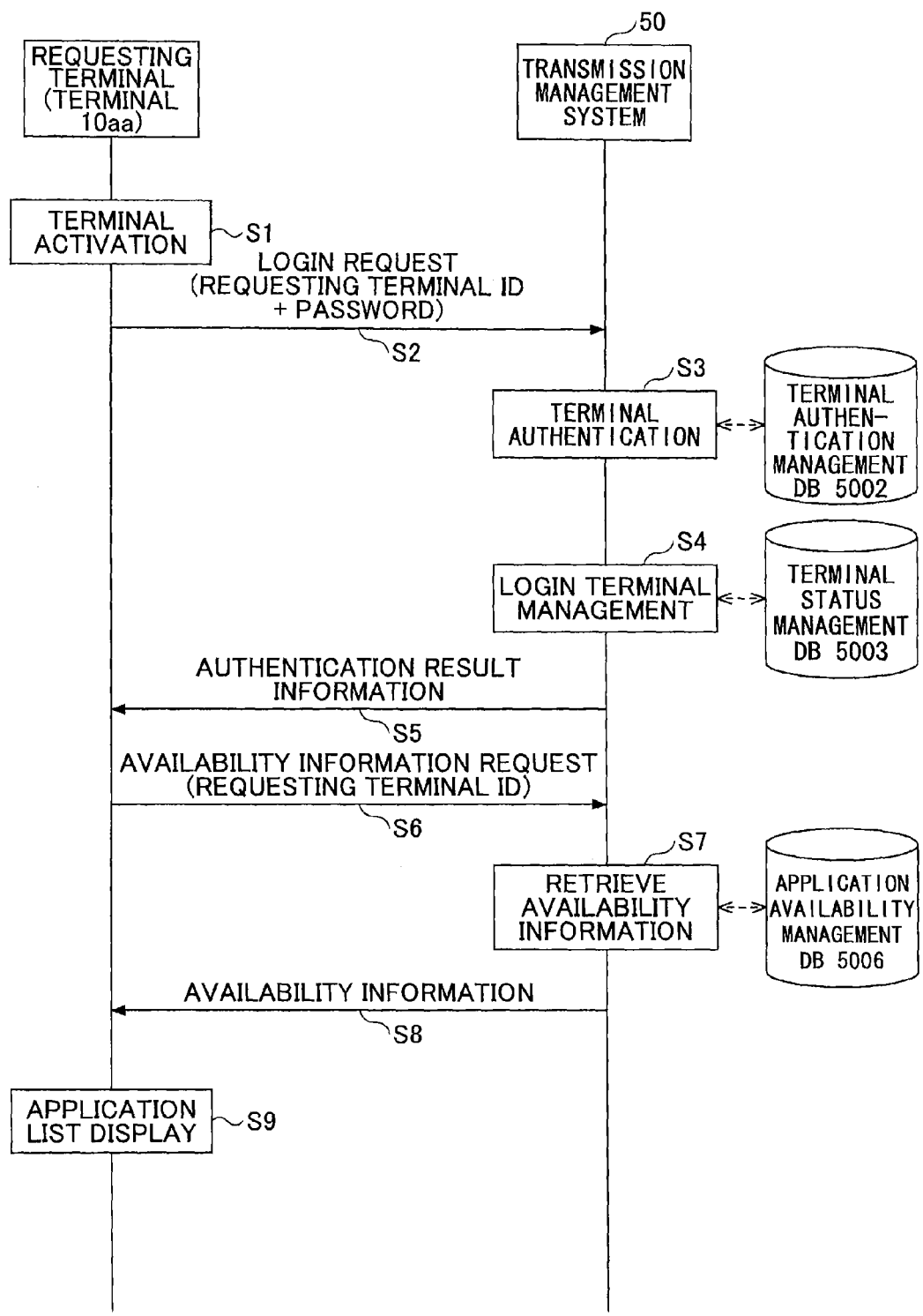
FIG. 14 is a sequence diagram illustrating processes of starting up a terminal 10aa being a requesting terminal and causing an application list to be displayed.

First, referring to FIG. 14, a procedure of activating the transmission terminal 10 is described below. FIG. 14 is a sequence diagram illustrating processes of starting up a transmission terminal 10*aa* being a requesting terminal and causing an application list to be displayed. Referring to FIG. 14, the various management information is transmitted and received by the management information session sei totally illustrated in FIG. 2. Protocols HTTP and TCP are used as a protocol in the management information session sei.

At first, the user turns on the power switch 109 illustrated in FIG. 5, then the operation input reception unit 12 illustrated in FIG. 7 receives the power on and causes the requesting terminal (the terminal 10aa) to activate (step S1). The transmission/reception unit 11 transmits a login request to the transmission management system 50 through the communication network 2 in response to a receipt of the power on (step S2). With this, the transmission/reception unit 51 of the transmission management system 50 receives a login request. The login request may be transmitted in response to an input of a command by the user of the requesting terminal (the terminal 10aa).

The login request includes the terminal ID and the password, which are provided for identifying the transmission terminal 10 being the own terminal as the request source. The terminal ID and the password may be retrieved from the storage unit 1000 via the storage/retrieval unit 19 and transmitted to the transmission/reception unit 11. Alternatively, the terminal ID and the password may be input by the user of the requesting terminal. When the login request information is transmitted from the requesting terminal 10aa to the transmission management system 50, the transmission management system 50 on the receipt side may acquire the IP address of the transmission terminal 10aa on the transmission side.

Next, the terminal authentication unit 52 of the transmission management system 50 authenticates the terminal by searching the terminal authentication management table of the storage unit 5000 using the terminal ID and the password, which are included in the login request information received via the 51, as a key and by determining whether the same terminal ID and password are stored in the terminal authentication management table (step S3).

If the terminal authentication unit 52 determines that the same terminal ID and password are managed in the terminal authentication management table and the login request is received from the transmission terminal 10 having a valid use authorization, the status management unit 53 stores in the terminal status management table the terminal ID of the transmission terminal 10aa, the operation state of the terminal 10aa, the date and time received when the login request information is received, and the IP address of the terminal 10aa in association with each other (step S4). In this way, the terminal ID "01aa", the operation state "online (call possible)", the date and time received "2012.11.10.13: 40", and the IP address of the terminal 10aa "1.2.1.3" are managed in association with each other in the terminal management table.

Then, the transmission/reception unit 51 of the transmission management system 50 transmits authentication result information indicating the authentication result obtained by the terminal authentication unit 52 to the requesting terminal (the transmission terminal 10aa) transmitting the login request via the communications network 2 (step S5). With this, the transmission/reception unit 11 of the requesting terminal (the transmission terminal 10aa) receives authentication result information.

Subsequently, described below is a case where the terminal authentication unit 52 determines that the transmission terminal has valid authorization.

The transmission/reception unit 11 of the requesting terminal (the transmission terminal 10aa) requests availability information to the transmission management system 50 via the communications network 2 (step S6). With this, the transmission/reception unit 51 of the transmission management system 50 receives an availability information request. The availability information request includes the terminal ID of the requesting terminal (the transmission terminal 10aa).

Next, the storage/retrieval unit 59 of the transmission management system 50 retrieves availability information corresponding to the terminal ID of the requesting terminal (the transmission terminal 10aa) received in step S6 from the application availability management table by searching the application availability management table using the terminal ID of the requesting terminal (the transmission terminal 10aa) as a search key (step S7).

Thereafter, the transmission management system 50 may read screen data of the application, an icon of the application, and so on from the storage unit 5000 and may send these to the transmission terminal 10aa. Within the embodiment, although it is described that the application is installed in the transmission terminal 10aa, the program providing system 90 may download the application to the logged-in transmission terminal 10.

Then, the transmission/reception unit 11 transmits the availability information read out in step S7 to the requesting terminal (the transmission terminal 10aa) via the communication network (step S8). With this, the transmission/ reception unit 11 of the requesting terminal (the transmission terminal 10aa) receives the availability information.

Next, the display control unit 16 causes the display 120aa to display an application list screen (step S9). The application list screen is described later with reference to FIG. 19. The application list screen displays application icons of all applications whose availability information is registered as available for use ("On").

In a case where a port used in the management information session sei is not opened, the above sequence process becomes difficult. Therefore, the activated transmission terminal 10aa examines a TCP port used to display the application list at a predetermined timing (S43 in FIG. 18).

Figure 15:
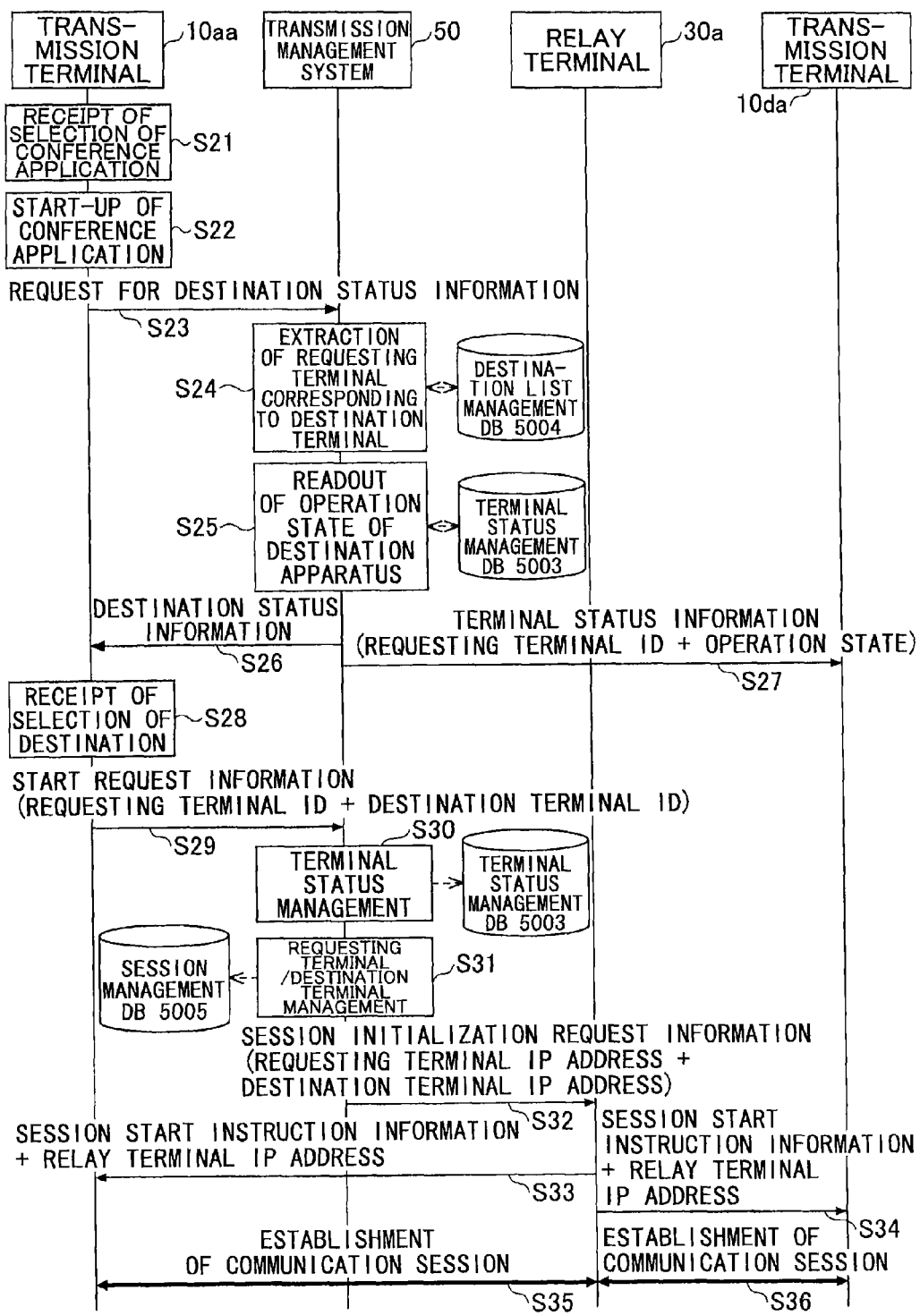
FIG. 15 is a sequence diagram illustrating processes of receiving a selection of a teleconference application by the terminal 10aa and establishing a session.

Subsequently, referring to FIG. 15, processes from receiving a selection of an application icon at the requesting terminal (the transmission terminal 10aa) to establishing a session are described. FIG. 15 is a sequence diagram illustrating processes of receiving a selection of a teleconference application by the terminal 10aa and establishing a session.

Figure 19:
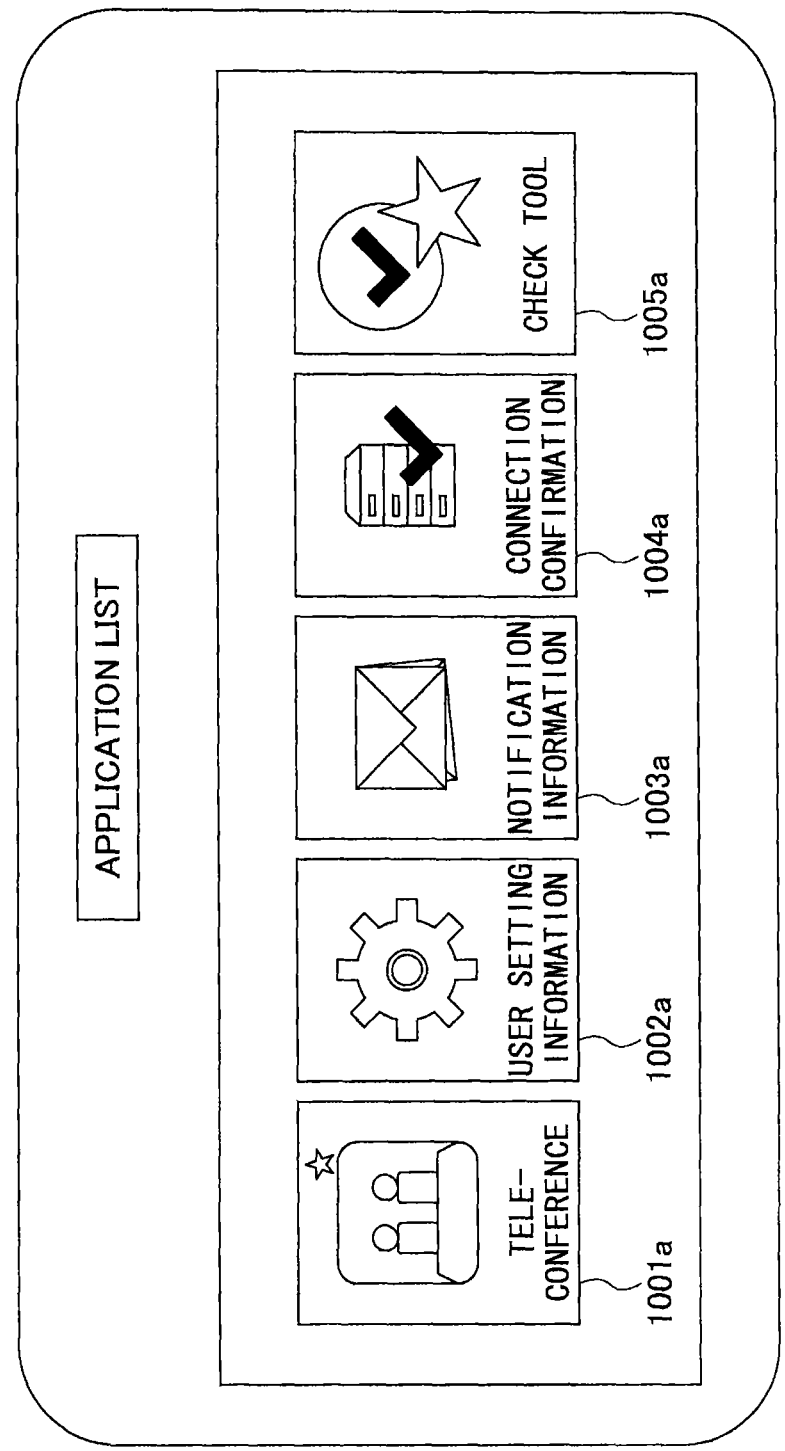
FIG. 19 illustrates an example of an application list screen to be displayed.

When the user operates the operation buttons 108a-108e, the operation input reception unit 12 of the requesting terminal (the transmission terminal 10aa) accepts a selection of the application icon selection among multiple application icons in FIG. 19 made by the user (step S21). Here, a teleconference application 1001 for conducting a teleconference is selected.

With this, the transmission terminal 10aa starts up the teleconference application 1001, and a function necessary for the transmission system 1 becomes available (step S22).

The transmission/reception unit 11 of the transmission terminal 10aa requests destination status information to the transmission management system 50 via the communications network 2 (step S23). The availability information request includes the terminal ID of the requesting terminal (the transmission terminal 10aa).

Then, the storage/retrieval unit 59 of the transmission management system 50 searches the destination list management table using the terminal ID as a search key, and reads a candidate of the destination terminal which can communicate with the requesting terminal (the transmission terminal 10aa) (step S24). Here, in order to simplify the explanation, the following explanation is continued based on an assumption that the destination terminal (a transmission terminal 10*da*) corresponding to the terminal ID "01aa" of the requesting terminal (the transmission terminal 10*aa*) is read out.

Next, the storage/retrieval unit 59 of the transmission management system 50 searches the terminal status management table using the terminal ID of the candidate of the destination terminal retrieved in step S24, and retrieves the destination names and the operation states for each terminal ID retrieved in step S24 (step S25).

The transmission/reception unit 51 of the transmission terminal 10*aa* transmits the destination status information to the requesting terminal (the transmission terminal 10*aa*) via the communications network 2 (step S26). With this, the transmission/reception unit 21 of the requesting terminal (the transmission terminal 10*aa*) receives the terminal ID, the destination name, and the operation state of the destination candidate as the destination status information.

Then, the transmission/reception unit 51 transmits "terminal status information" including the terminal ID "01aa" of the requesting terminal (the transmission terminal 10*aa*) and operation state information of the operating status of the requesting terminal (the transmission terminal 10*aa*) to the terminal 10*da*. With this, the transmission/reception unit 11 of the call terminal 10*da* receives the status information of the terminal 10*aa* (step S27).

The display control unit 16 of the requesting terminal (the transmission terminal 10*aa*) causes the display 120 to display a destination list screen (not illustrated) displaying a view of the destination list formed by arranging the destination names of the destination candidates and the operation states on a list. Because the user selects an arbitrary destination terminal (here, the transmission terminal 10*da*), the operation input reception unit 12 receives a selection (step S28).

The transmission/reception unit 11 of the requesting terminal (the transmission terminal 10*aa*) transmits start request information, which includes the terminal ID "01aa" of the requesting terminal (the transmission terminal 10*aa*) and the terminal ID "01da" of the destination terminal (the transmission terminal 10*da*), to the transmission management system 50 (step S29). With this, the transmission/reception unit 51 of the transmission management system 50 receives the above start request information and simultaneously receives the IP address "1.2.1.3" of the requesting terminal (the transmission terminal 10*aa*) being the transmission source.

Based on the terminal ID "01aa" of the requesting terminal (the transmission terminal 10*aa*) and the terminal ID "01da" of the destination terminal (the transmission terminal 10*da*) which are included in the start request information, the status management unit 53 of the transmission management system 50 changes field portions of the operation states of the records of the terminal status management table, in which the terminal ID "01aa" and the terminal ID "01da" are included (step S30).

Next, the session management unit 55 stores and manages the relay terminal ID "111a" of the used relay terminal 30*a*, the terminal ID "01aa" of the requesting terminal (the transmission terminal 10*aa*), and the terminal ID "01da" of the destination terminal (the transmission terminal 10*da*) in the session management table of the storage unit 5000 while associating these (step S31). For example, in this case, the relay terminal 30*a* having an IP address closest to the IP address of the requesting terminal (the transmission terminal 10*aa*) is selected.

Next, the transmission/reception unit 51 of the transmission management system 50 transmits session initialization request information to the relay terminal 30*a* (step S32). With this, the relay terminal 30*a* receives the session initialization request information. The session initialization request information is a command for initializing the communication session of the relay terminal 30*a* and includes the IP address "1.2.1.3" of the requesting terminal (the transmission terminal 10*aa*) and the IP address "1.3.2.3" of the destination terminal (the transmission terminal 10*da*). These IP addresses respectively correspond to terminal IDs of the terminal status management table.

Next, the relay terminal 30*a* transmits session start instruction information to the requesting terminal (the transmission terminal 10*aa*) based on the IP address "1.2.1.3" of the requesting terminal (the transmission terminal 10*aa*) received in step S12 (step S33). The session start instruction information is an instruction to start a communication session to the requesting terminal (the transmission terminal 10*aa*). At this time, the IP address "1.2.1.2" of the relay terminal 30*a* is also transmitted.

Similarly, the relay terminal 30*a* transmits the session start instruction information to the destination terminal (the transmission terminal 10*da*) based on the IP address "1.3.2.3" of the destination terminal (the transmission terminal 10*da*) (step S34). This session start instruction information is an instruction to start a communication session to the destination terminal (the transmission terminal 10*da*). At this time, the IP address "1.2.1.2" of the relay terminal 30*a* is also transmitted.

With this, a first communication session sed1 is established between the requesting terminal (the transmission terminal 10*aa*) and the relay terminal 30*a* (step S35).

Further, a second communication session sed2 is established between the destination terminal (the transmission terminal 10*da*) and the relay terminal 30*a* (step S36). The first communication session sed1 and the second communication session sed2 correspond to the image/audio information session sed illustrated in FIG. 2.

With this, the image and the voice are transmitted and received between the requesting terminal (the transmission terminal 10*aa*) and the destination terminal (the transmission terminal 10*da*). For example, RTP and UDP are used as a protocol in the image/audio information session sed.

<Concerning Protocol>

Regarding a protocol structure, an OSI reference model formed of 7 layers is known. A TCP/IP protocol structure is used for ease of explanation.

Figure 16:
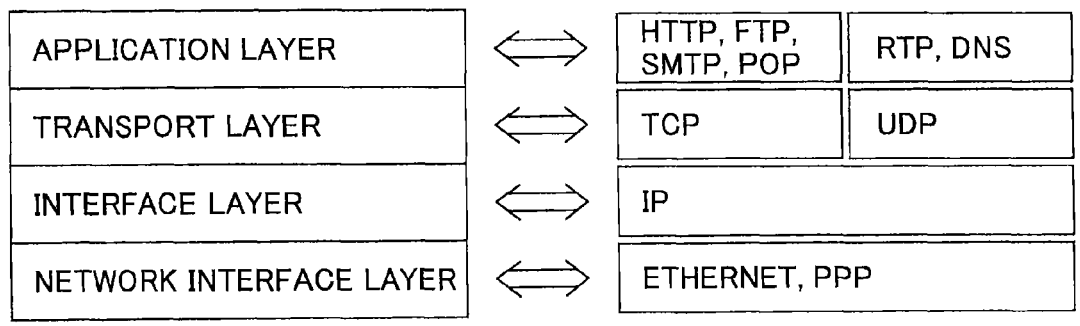
FIG. 16 illustrates an example of explaining a relationship between layers of a TCP/IP protocol structure and corresponding protocols.

FIG. 16 illustrates an example of explaining a relationship between layers of a TCP/IP protocol structure and corresponding protocols. Ethernet ("Ethernet" is a registered trademark) and PPP (Point to Point Protocol) are known as the protocols in the network interface layer, for example. IP is mainly used as the protocol in the Internet layer. TCP and UDP are mainly used as the protocols in the transport layer. The protocols in the application layer are various. The protocols mainly using the TCP are HTTP, FTP, SMTP, POP, or the like. The protocols mainly using the UDP are Real-time Transport Protocol (RTP), Domain Name System (DNS), or the like.

For example, HTTP notifies TCP of the IP address and the port number of a communication counterpart. The port number is a value in a range of 0 to 65535. However, it is sufficient to designate the port number used by the known protocol in the application layer of the counterpart in advance. For example, the port number of HTTP on the server side is 80. Internet Assigned Numbers Authority (IANA) manages the port numbers from 0 to 1023 or less as a Well-Known port.

TCP creates a TCP header using these information. The TCP header stores a counterpart destination port number and an arbitrary transmission source port number that is not used (an IP address is stored in an IP header). For example, a structure similar thereto is applicable to a case where RTP communicates using UDP.

As described above, it is necessary to designate the port number in addition to the designation of the IP address. Referring to FIG. 1, multiple LANs are connected via the routers 70 in the communication network. Ordinarily, when an apparatus existing inside a LAN transmits data to an apparatus existing outside the LAN, the local IP address and the port number of the transmission source are converted to a global IP address and an arbitrary port number of the router 70, and the converted global IP address and the converted arbitrary port number are transmitted (NAPT: Network Address Port Translation). In a case where the global IP address of the router and the converted arbitrary port number are designated in the TCP header responded from the outside, the global IP address and the converted arbitrary port number are converted back to the original local IP address and the original port number and transferred to the apparatus inside the LAN. Therefore, the port of the router 70 does not interfere with the response to the transmission originated from the inside of the LAN.

However, in the transmission system 1, the image and the voice are transmitted from the counterpart transmission terminal 10da existing outside the LAN at an arbitrary timing, and management information (described later) is notified from the transmission management system 50. In this case, if a port for transmitting the image and the voice and a port for transmitting management information from the transmission management system are not opened (for example, the port is not registered in a NAPT conversion table), the transmission terminal 10aa existing inside the LAN cannot receive these.

Therefore, the tool check application of the embodiment examines whether the protocols respectively used by the management information session sei and the image/audio information session sed are opened. With this, the user can accurately know whether the transmission system 1 is available in the communication environment.

Inconvenience of Unopened Port

Figure 17A:
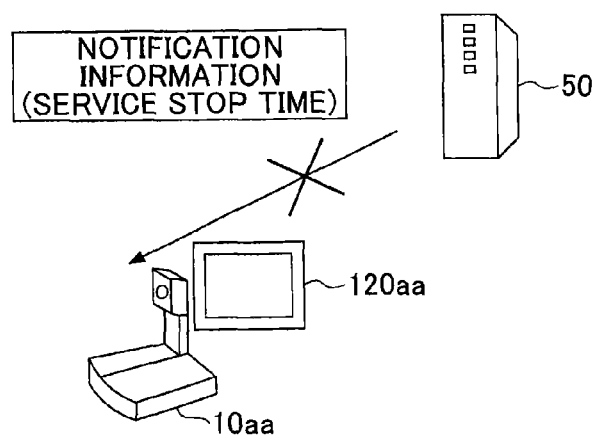
FIG. 17A illustrates an example explanation of an inconvenience occurring in a case where a port used by a protocol used by a management information session sei is not opened.

Subsequently, specific inconveniences caused by unopened port in the transmission system 1 are described. 1. A case where the port used by the protocol used by the image/audio information session sed is not opened. The protocol used by the image/audio information session sed is, for example, RTP. RTP uses UDP as the protocol in the transport layer, and Nos. m1 to m3 are designated as the port number. RTP is an example, and any protocol may be used in the communication. In a case where the port numbers from No. m1 to No. m3 are not opened in the router, the transmission terminal 10aa cannot receive the image and the voice from the transmission terminal 10da. Therefore, in a case where the port used by the protocol used by the image/audio information session sed is not opened, the user cannot use the transmission system 1. 2. A case where the port used by the protocol used by the management information session sei is not opened. FIG. 17A illustrates an inconvenience occurring in the case where the port used by the protocol used by the management information session sei is not opened. The protocol used in the management information session sei is, for example, HTTP. HTTP uses TCP as the protocol in the transport layer, and No. n is designated as the port number. The number of the port numbers may be plural. HTTP is an example, and any protocol may be used in the communication.

There is a case where the transmission management system 50 transmits notification information as management information to the transmission terminal 10aa. The notification information is various. For example, the notification information is a service stop time, interference information, general information about recovery, and so on. Most part of the notification information does not make a use of the transmission system 1 difficult even though the transmission terminal 10aa cannot receive the information. However, the user has an inconvenience such that the user cannot receive the notification from the transmission management system at all.

Figure 17B:
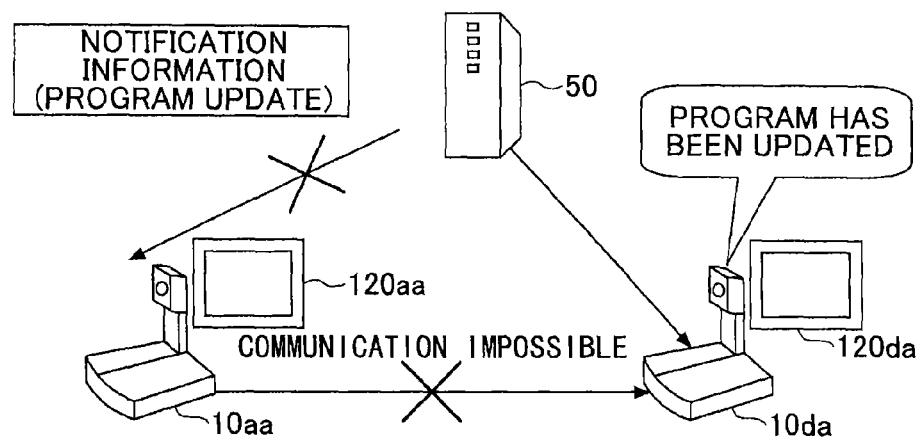
FIG. 17B illustrates an example explanation of an inconvenience occurring in a case where a port used by a protocol used by the management information session sei is not opened.

Referring to FIG. 17B, described is a case where the transmission terminal 10aa cannot receive the notification information, which is important as the management information. As described, several applications operate in the transmission terminal 10, and the transmission of the image and the voice is controlled by the teleconference application 1001. There may be a case where the teleconference application 1001 is subjected to a version upgrade in a manner similar to an ordinary application. Because the transmission management system 50 notifies the transmission terminal 10aa of update information (the version upgrade information), the user who knows the version upgrade) conducts the version upgrade of the teleconference application 1001. The update information includes the version number of the latest version, a changed portion, an updated date, and so on. In a minor version upgrade, a difference of the versions of the transmission terminals 10aa and 10da does not bring about a serious inconvenience. However, when there is a great version upgrade and only the transmission terminal 10aa does not undergo the version upgrade, even if the protocol used in the image/audio information session sed is opened, there is a case where the transmission terminals 10aa and 10da cannot transmit and receive the image/audio data. Therefore, depending on the importance of the notification information, there is an inconvenience that the use of the transmission system 1 is difficult.

Figure 17C:
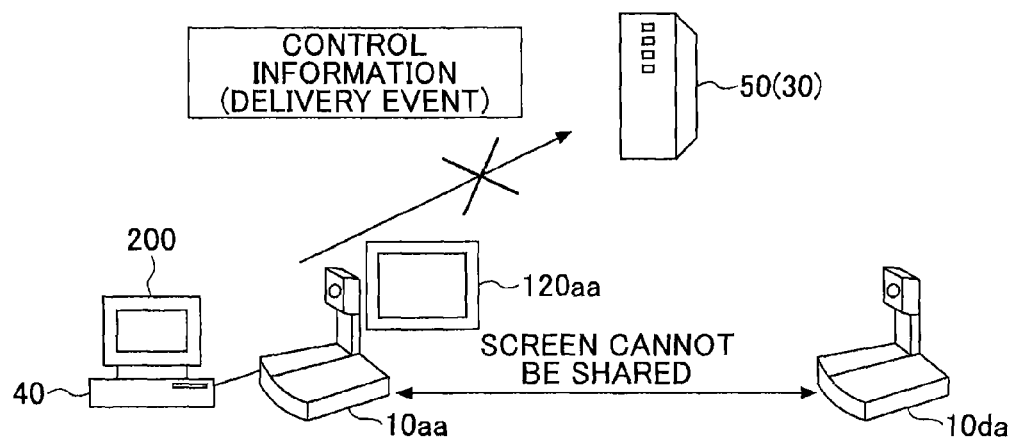
FIG. 17C illustrates an example explanation of an inconvenience occurring in a case where a port used by a protocol used by the management information session sei is not opened.

Referring to FIG. 17C, described is an inconvenience that the control information is not transmitted because the port used by the protocol used by the management information session sei is not opened. Referring to FIG. 17C, the transmission terminal 10aa and the external apparatus 40 are connected. The external apparatus 40 is an information processing apparatus such as a PC, a smartphone, and a tablet terminal. The external apparatus 40 takes in (captures) a screen displayed on the display 200 and transmit the screen to the transmission terminal 10aa. Because the transmission terminal 10aa transmits the screen to the transmission terminal 10da, the transmission terminals 10aa and 10da can share the screen of the external apparatus 40.

Although the user can start or stop sharing the screen, the transmission terminal 10aa transmits a delivery event corresponding to an operation to the relay terminal 30 (or the transmission management system 50). The relay terminal 30 controls sharing of the screen with the transmission terminal 10da. Therefore, if the port used by the protocol used by the management information session sei is not opened, there is a case where the sharing of the screen is difficult.

As described, in the case where the port used by the protocol used by the management information session sei is not opened, the transmission system 1 is not necessarily difficult to use. However, because there is a case where an inconvenience occurs, it is desirable to let the user accurately know the present communication environment.

Check Tool Application

Figure 18:
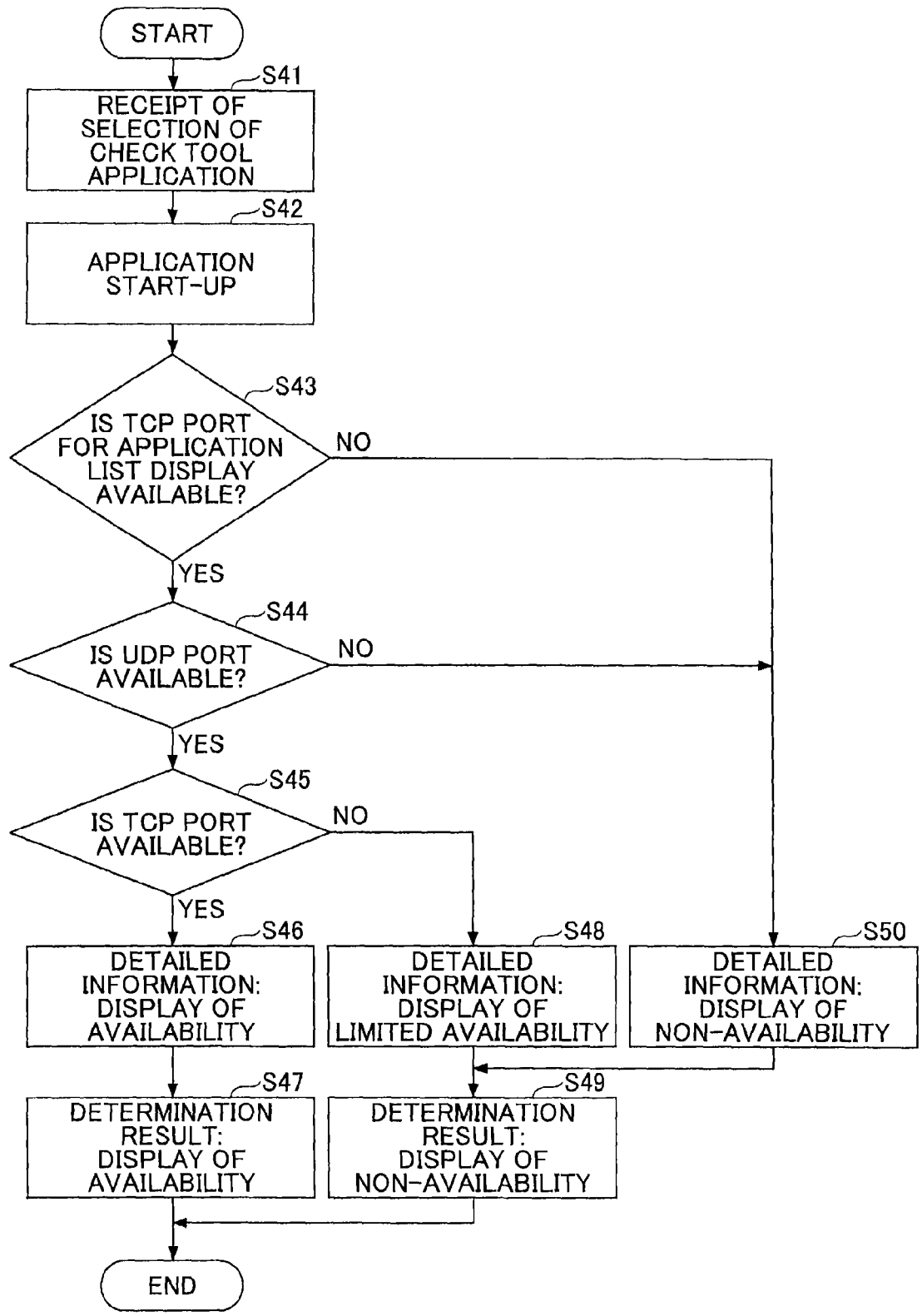
FIG. 18 is an exemplary flowchart indicative of a process in which the transmission terminal 10aa receiving a selection of the check tool application examines a communication environment.

FIG. 18 is an exemplary flowchart indicative of a process in which the transmission terminal 10*aa* receiving a selection of the check tool application examines the communication environment.

The user operates operation buttons 108*a*-108*e* and selects one of multiple application icons illustrated in FIG. 19. The operation input reception unit 12 of the requesting terminal (the transmission terminal 10*aa*) receives a selection of the application icon by the user (step S41). Here, the check tool application 1005 for examining the communication environment is selected. With this, the transmission terminal 10*aa* starts up the check tool application 1005 (step S42). Thus, the check unit 14 is validated.

At first, the check unit 14 examines whether a port used by TCP for displaying the application list is available (step S43). This port used by TCP may be the same as or different from the port of TCP used by the transmission system 1 examined in step S45.

In a case where the port used by TCP for displaying the application list (NO of step S43) is not available, the check unit 14 causes the display control unit 16 to display an issue that both TCP and UDP are not available as detailed information (step S50).

In a case where the port used by TCP for displaying the application list (YES of step S43) is available, the check unit 14 checks whether the ports (m1 to m3) used by RTP in UDP are available as follows (step S44).

The check unit 14 requests the transmission/reception unit to conduct a data transmission to all the ports of UDP used by the transmission system 1. The transmission/reception unit 11 transmits data using the UDP protocol upon receipt of a request from the check unit 14. The data quantity to be transmitted is predetermined. For example, the data of 1024 bytes are transmitted.

The transmission/reception unit 11 waits for a response to the transmitted data. If there is at least one port returning no response after a predetermined time (for example, 4 seconds), the transmission/reception unit 11 returns a determination result indicative of "the UDP protocol is not available (NO)" to the check unit 14.

If responses are returned from all ports of UDP, the transmission/reception unit 11 returns a determination result indicative of "the UDP protocol is available (YES)" to the check unit 14. Then, the check unit 14 examines whether a port used by TCP is available (step S45). The check unit 14 requests the transmission/reception unit 11 to conduct a data transmission to a specific port of TCP used by the transmission system 1. The transmission/reception unit 11 transmits data using the TCP protocol upon receipt of a request from the check unit 14. The data quantity to be transmitted is predetermined. For example, the data of 1024 bytes are transmitted.

The transmission/reception unit 11 waits for a response to the transmitted data. If there is no response after a predetermined time (for example, 4 seconds), the transmission/reception unit 11 returns a determination result indicative of "TCP is not available (NO)" to the check unit 14.

If responses are returned from all ports of TCP, the transmission/reception unit 11 returns a determination result indicative of "TCP is available (YES)" to the check unit 14.

The check unit 14 causes the display control unit 16 to display an issue that both UDP and TCP are available as detailed information (step S46).

Next, the check unit 14 causes the display control unit 16 to display an issue that a network used by the transmission system 1 is available as a determination result (step S47) and ends the process (step S47). Hereinafter, a screen on which the detailed information and the determination result are described is referred to as a "check result screen". Naturally, the detailed information and the determination result may be displayed on different screens. Referring to FIGS. 20 to 22, the check result screen is described.

In a case where the TCP port is not available (NO of step S45), the check unit 14 causes the display control unit 16 to display an issue that the availability is limited (TCP is not available) as detailed information (step S48).

Next, the check unit 14 causes the display control unit 16 to display an issue that the network used by the transmission system 1 is not available as the determination result (step S49). This is because all the protocols are not available and therefore the determination result needs to be determined that the availability is negative.

In a case where the UDP port is not available (NO of step S44), the transmission system 1 is available but the TCP port is not available. Therefore, the check unit 14 causes the display control unit 16 to display an issue that both TCP and UDP are not available as the detailed information (step S50). Here, even though the UDP port is difficult to use, the TCP port may be determined to be available. Provided that TCP is hard to make available, the user can correctly know the communication environment.

Next, the check unit 14 causes the display control unit 16 to display an issue that the network used by the transmission system 1 is not available as the determination result (step S49) and ends the process.

Screen Example

FIG. 19 illustrates an example of an application list screen to be displayed on the display 120. Icons of the applications permitted to be started up are displayed on a list of the application list screen. Referring to FIG. 19, an icon 1001*a* of the teleconference application, an icon 1002*a* of the user setting information application, an icon 1003*a* of the notification information application, an icon 1004*a* of the connection confirmation application, and an icon 1005*a* of the check tool application are displayed. The user can select an arbitrary application.

FIGS. 20 to 22 are examples of the check result screen displayed on the display 120. The check result screen mainly includes a determination section 301 and a detailed information section 303. It is described in the determination section 301 whether the transmission system 1 is available in the communication environment as the "determination result". For example, the display is as follows.

In a case of the available communication environment: "It is confirmed to be a recommendable network environment." and an overall determination icon A In a case where it is not the available communication environment: "The requisite for the use is not satisfied." and an overall determination icon B The determination icons A and B are icons causing the user to know the determination results at a glance. By the overall determination icons A and B, the user can know whether the communication environment is available without reading the descriptions in the determination section 301. The overall determination icon A is exemplified in FIG. 20, and the overall determination icon B is exemplified in FIGS. 21 and 22.

Meanwhile, the detailed information section 303 displays whether the port is opened corresponding to the port number as the above "detailed information", and also displays an influence caused when the port is not opened. For example, the display is as follows. —In a case where both ports of TCP/UDP are opened: TCP/UDP "OK", "Transmission system can be used."—In a case where the port of TCP is not opened and the port of UDP is opened: n-th TCP "x", UDP "OK", "Only notice function cannot be used."—In a case where the port of UDP is not opened: UDP: m1 "x", m2 "OK", m3 "x", TCP "not yet determined", "Transmission system cannot be used." FIG. 20 illustrates an example of a check result screen displayed in a case where both of TCP and UDP are available. Because both of TCP and UDP are available, the determination section 301 displays "It is confirmed to be a recommendable network environment." and the overall determination icon A, and the detailed information section 303 displays "TCP/UDP "OK"", "Transmission system can be used.". As illustrated, the determination results of the two communication ports are individually displayed.

A diagnosis item section indicates a progress of a diagnosis and displays whether the port is opened and another diagnostic result. The content of the diagnosis item section 302 is displayed in the detailed information section 303. The other diagnosis results are "confirmation of network delay time" and "band measurement". These diagnoses are conducted by the check tool application 1005. At first, in the confirmation of the open of the port, it is displayed that "port is opened." in response to the above check result. In the "confirmation of network delay", a delay time between the transmission and the receipt is displayed. In the "band measurement", the communications in the transmission (the upstream) and the receipt (the downstream) are displayed.

In a region selection section 304, the region of the user and the country of the user can be selected. This is to enable the check tool application 1005 to refer to the transmission management system and the relay terminal, which are located closer to the user, at a time of the check by the check tool application 1005.

FIG. 21 illustrates an example of the check result screen in a case where UDP is not available. The determination section 301 displays "The requisite for the use is not satisfied." The detailed information section 303 displays UDP: m1 "x", m2 "∘", m3 "x", TCP "not yet determined", "Transmission system cannot be used." Even though TCP is not yet determined, TCP can be displayed as "x". In a case where the TCP port is examined, the determination result of the open of the port is displayed.

FIG. 22 illustrates an example of the check result screen in a case where only TCP is not available. The determination section 301 displays "The requisite for the use is not satisfied." The detailed information section 303 displays n-th TCP "x", UDP "OK", "Only notice function cannot be used."

When the user views this check result screen, the user can know that although the transmission system 1 is available because the port of UDP is open, there is a case where the function may not be partly usable. Further, from the description that "Only notice function cannot be used.", it is possible to know what kind of inconvenience exists using a help function. Specifically, it is possible to know "the maintenance information is not notified", "there may be a case where the transmission and receipt of the image and the voice are impossible because of the version difference from the counterpart transmission terminal caused by the difficulty of the program update", "the screen of the external apparatus cannot be shared", and so on, which are explained with reference to FIGS. 17A to 17C. Alternatively, these information may be directly displayed without using the help function, the link, or the like.

By displaying the determination result for each of the multiple protocols used in the transmission system 1, it is unnecessary to give up the use of the transmission system 1 despite the availability of the transmission system 1. Therefore, the transmission system 1 is available by the user's determination. Further, by displaying a situation which may be caused by the unavailability of the protocol using the message, the user can determine whether the transmission system 1 is available for the user and whether the user uses the transmission system 1.

Within the embodiment, in a case where a single protocol uses multiple ports, the check tool application 1005 displays whether each port opens. With this, the user can select the ports in which the protocol is available and can know the selected ports. For example, in a case where the communication speed can be lowered, the user can change a setup of the transmission terminal 10 so that the communication is conducted using only the opened port.

Further, in a case where there is an unopened port, it is effective to display how to deal with the unopened port. For example, it is displayed that "Please check again in a room having a different communication environment.". Further, within the embodiment, the check tool application 1005 can display the unopened port number. Therefore, for example, it is displayed that "Please open the port number n (or m1 to m3)". With this, the user can specifically deal with so as to use the transmission system 1.

The embodiments do not limit the scope of claims and there are naturally various system configurations depending on the uses and the objects. For example, the transmission terminal or the information processing apparatus other than the PC 20 may have only a check function. Or, the functions of the transmission management system 50 may be distributed and performed by multiple information processing apparatuses. The function of the transmission terminal 10 need not be built in the transmission terminal but may be called and used by the transmission terminal 10.

Further, the storage unit 5000 belonging to the transmission management system 50 may be provided on a network, to which the transmission management system 50 can access. The storage unit 1000 belonging to the transmission terminal 10 may exist in a network, to which the transmission terminal 10 can access.

Although the explanation has been given to a case where the number of the protocols to be examined is 2, 3 or greater protocols may be examined. Even in a case where a single protocol is used, multiple ports may be examined.

As described above, although the information processing apparatus has been described in detail, the present invention is not limited to the above embodiments, and variations and modifications may be made within the gist of the present invention recited in the scope of claims.

This application is a continuation application filed under 35 U.S.C. 111(a) claiming the benefit under 35 U.S.C. 120 and 365(c) of a PCT International Application No. PCT/JP2014/070602 filed on Aug. 5, 2014, which is based upon and claims the benefit of priority of Japanese Patent Application No. 2013-163166 filed on Aug. 6, 2013, the entire contents of which are incorporated herein by reference.

EXPLANATION OF REFERENCE SIGNS

1: transmission system
10: transmission terminal

20: PC
30: relay terminal
50: transmission management system
120: display

Patent Document

[Patent Document 1] Japanese Laid-Open Patent Publication No. 2007-150916

The invention claimed is:

1. An information processing apparatus comprising:
circuitry configured to
determine whether a first communication port used by a first communication protocol is available, the first communication protocol controlling transmission of image and voice data,
determine whether a second communication port used by a second communication protocol is available, the second communication protocol controlling transmission of management information data,
determine an available service of the information processing apparatus based on a determination result for the first communication port and a determination result for the second communication port,
display the determination result for the first communication port and the determination result for the second communication port individually on a display,
display a non-availability status in response to the first communication port not being available,
display a limited-availability status in response to the first communication port being available and the second communication port not being available, and
terminate the determination of available service.

2. A determination result providing method of providing a determination result comprising:
determining, with circuitry, whether a first communication port used by a first communication protocol is available, the first communication protocol controlling transmission of image and voice data;
determining, with the circuitry, whether a second communication port used by a second communication protocol is available, the second communication protocol controlling transmission of management information data;
determining, with the circuitry, a service of an information processing apparatus based on a determination result for the first communication port and a determination result for the second communication port;
displaying, with the circuitry the determination result for the first communication port and the determination result for the second communication port individually on a display, the displaying further including
displaying a non-availability status in response to the first communication port not being available, and
displaying a limited-availability status in response to the first communication port being available and the second communication port not being available; and
terminating, with the circuitry, the determination of available service.

3. A non-transitory computer-readable storage medium storing a program for causing a computer to execute a method, the method comprising:
determining whether a first communication port used by a first communication protocol is available, the first communication protocol controlling transmission of image and voice data;
determining whether a second communication port used by a second communication protocol is available, the second communication protocol controlling transmission of management information data;
determining a service of the computer based on a determination result for the first communication port and a determination result for the second communication port;
displaying the determination result for the first communication port and the determination result for the second communication port individually on a display, the displaying further including
displaying a non-availability status in response to the first communication port not being available, and
displaying a limited-availability status in response to the first communication port being available and the second communication port not being available; and
terminating the determination of available service.

4. The non-transitory computer-readable storage medium storing the program according to claim 3, further comprising:
displaying a Port number of the first communication port or the second communication port, in response to determining that the first communication port or the second communication port is not available.

5. The method according to claim 2, further comprising:
displaying a port number of the first communication port or the second communication port, in response to determining that the first communication port or the second communication port is not available.

6. The non-transitory computer-readable storage medium storing the program according to claim 3, further comprising:
displaying notification that information, in which the second communication protocol is transmitted through the second communication port from an external device connected to the computer via a network, cannot be received due to the limited-availability of communication.

7. The non-transitory computer-readable storage medium storing the program according to claim 3, further comprising:
displaying notification that program update information, in which the second communication protocol is transmitted through the second communication port from an external device connected to the computer via a network, cannot be received due to the limited-availability of communication.

8. The non-transitory computer-readable storage medium storing the program according to claim 3, further comprising:
displaying notification that another computer connected through a network and the computer cannot share a screen, which is displayed by the information processing apparatus connected to the computer on a second display, due to the limited-availability of communication.

9. The non-transitory computer-readable storage medium storing the program according to claim 3,
wherein, the first communication protocol is UDP and the second communication protocol is TCP.

10. The method according to claim 2,
wherein, the first communication protocol is UDP and the second communication protocol is TCP.

11. The non-transitory computer-readable storage medium storing the program according to claim 4, wherein, the first communication protocol is UDP and the second communication protocol is TCP.

12. The non-transitory computer-readable storage medium storing the program according to claim 5, wherein, the first communication protocol is UDP and the second communication protocol is TCP.

13. The non-transitory computer-readable storage medium storing the program according to claim 6, wherein, the first communication protocol is UDP and the second communication protocol is TCP.

14. The non-transitory computer-readable storage medium storing the program according to claim 7, wherein, the first communication protocol is UDP and the second communication protocol is TCP.

15. The non-transitory computer-readable storage medium storing the program according to claim 8, wherein, the first communication protocol is UDP and the second communication protocol is TCP.

16. The information processing apparatus of claim 1, wherein the first communication protocol is associated with a first available service, and the second communication protocol is associated with a second available service.

17. The information processing apparatus of claim 1, wherein the first communication protocol and the second communication protocol are protocols of different layers of the TCP/IP communication layers.

18. The information processing apparatus of claim 1, wherein the circuitry is further configured to:
   display at least one trouble-shooting option when either one of the first communication port and the second communication port is not available.

19. The information processing apparatus of claim 1, wherein the circuitry is further configured to:
   display an icon associated with the overall determination of available service such that an icon associated with a first available service is different from an icon associated with a second, more limited service.

* * * * *